(12) United States Patent
Kawai

(10) Patent No.: US 7,339,623 B2
(45) Date of Patent: Mar. 4, 2008

(54) CAMERA AND IMAGE PICKUP DEVICE UNIT WHICH REDUCE INFLUENCE OF DUST IMAGE QUALITY

(75) Inventor: Sumio Kawai, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 710 days.

(21) Appl. No.: 10/300,728

(22) Filed: Nov. 20, 2002

(65) Prior Publication Data
US 2003/0218685 A1 Nov. 27, 2003

(30) Foreign Application Priority Data
May 27, 2002 (JP) .............................. 2002-153018

(51) Int. Cl.
*H04N 5/225* (2006.01)
(52) U.S. Cl. ...................... 348/340; 348/374
(58) Field of Classification Search ................ 348/335, 348/340, 357, 374
See application file for complete search history.

(56) References Cited

U.S. PATENT DOCUMENTS

| 4,387,973 | A | * | 6/1983 | Martin ....................... 359/507 |
| 4,441,796 | A |   | 4/1984 | Shaw |
| 4,841,387 | A |   | 6/1989 | Rindfuss |
| 4,896,217 | A |   | 1/1990 | Miyazawa et al. |
| 4,920,420 | A |   | 4/1990 | Sano et al. |
| 4,929,072 | A | * | 5/1990 | Fujie et al. ................. 359/507 |
| 4,998,800 | A |   | 3/1991 | Nishida et al. |
| 5,170,288 | A |   | 12/1992 | Imaizumi et al. |
| 5,227,888 | A |   | 7/1993 | Haga |
| 5,760,528 | A |   | 6/1998 | Tomikawa |
| 5,910,700 | A |   | 6/1999 | Crotzer |
| 5,995,279 | A |   | 11/1999 | Ogino et al. |
| 6,031,998 | A | * | 2/2000 | Shono ......................... 396/75 |
| 6,078,438 | A |   | 6/2000 | Shibata et al. |

(Continued)

FOREIGN PATENT DOCUMENTS

JP  57-078032 A  5/1982

(Continued)

OTHER PUBLICATIONS

Takizawa et al., U.S. Appl. No. 10/300,688, Nov. 20, 2002.*

*Primary Examiner*—Tuan Ho
*Assistant Examiner*—Richard M. Bemben
(74) *Attorney, Agent, or Firm*—Frishauf, Holtz, Goodman & Chick, P.C.

(57) ABSTRACT

A camera is provided which includes a dust-proofing member having a substantially circular or polygonal plate-shape and a transparent portion at an area having at least a predetermined length in a radial direction from a center of the dust-proofing member. The transparent portion is opposed to a front of an optical device at a predetermined interval, and an interval of an equivalent optical path length of at least 5 mm is provided between a surface of the dust-proofing member and the photoelectrically converting surface of the image pick-up device. And a sealing structure portion is arranged at a portion formed by opposing the image pick-up device and the dust-proofing member. The sealing structure seals a space portion that is substantially sealed at peripheral portions of the image pick-up device and the dust-proofing member.

26 Claims, 12 Drawing Sheets

U.S. PATENT DOCUMENTS

| | | | |
|---|---|---|---|
| 6,157,781 A * | 12/2000 | Konno et al. | 396/71 |
| 6,163,340 A | 12/2000 | Yasuda | |
| 6,564,018 B2 | 5/2003 | Melman et al. | |
| 6,583,819 B2 * | 6/2003 | Ito et al. | 348/335 |
| 6,778,325 B2 | 8/2004 | Osawa | |
| 7,006,138 B2 * | 2/2006 | Kawai | 348/340 |
| 2001/0053288 A1 | 12/2001 | Ito et al. | |
| 2001/0055072 A1 * | 12/2001 | Mogamiya et al. | 348/335 |
| 2002/0171751 A1 | 11/2002 | Ohkawara | |
| 2003/0202114 A1 | 10/2003 | Takizawa et al. | |
| 2003/0214588 A1 | 11/2003 | Takizawa et al. | |
| 2004/0012714 A1 * | 1/2004 | Kawai | 348/374 |
| 2004/0090549 A1 | 5/2004 | Takizawa et al. | |

FOREIGN PATENT DOCUMENTS

| | | | |
|---|---|---|---|
| JP | 58-152201 A | | 9/1983 |
| JP | 59-006399 U | | 1/1984 |
| JP | 62-165127 A | | 7/1987 |
| JP | 63-009970 A | | 1/1988 |
| JP | 63-131498 U | | 8/1988 |
| JP | 01-230016 A | | 9/1989 |
| JP | 02-001699 A | | 1/1990 |
| JP | 2-065369 U | | 5/1990 |
| JP | 02-132860 A | | 5/1990 |
| JP | 03-244281 A | | 10/1991 |
| JP | 4-047769 A | | 2/1992 |
| JP | 19920217 A | * | 2/1992 |
| JP | 04-104918 A | | 4/1992 |
| JP | 05-167051 A | | 7/1993 |
| JP | 05-213286 A | | 8/1993 |
| JP | 07-151946 | * | 6/1995 |
| JP | 07-151946 A | | 6/1995 |
| JP | 7-222068 A | | 8/1995 |
| JP | 07-322153 | * | 12/1995 |
| JP | 07-322153 B2 | | 12/1995 |
| JP | 7-322153 B2 | | 12/1995 |
| JP | H07-322153 | * | 12/1995 |
| JP | 08-079633 | * | 3/1996 |
| JP | 08-079633 A | | 3/1996 |
| JP | HEI 8-79633 | * | 3/1996 |
| JP | 09-124366 A | | 5/1997 |
| JP | 09-130654 A | | 5/1997 |
| JP | 2809133 | | 7/1998 |
| JP | 10-268129 A | | 10/1998 |
| JP | 2000-029132 A | | 1/2000 |
| JP | 2000-066021 A | | 3/2000 |
| JP | 2000-124519 A | | 4/2000 |
| JP | 2000-330054 A | | 11/2000 |
| JP | 2001-298640 A | | 10/2001 |
| JP | 2001-345392 A | | 12/2001 |
| JP | 2001-358287 A | | 12/2001 |
| JP | 2001-358974 A | | 12/2001 |
| JP | 2002-050751 A | | 2/2002 |
| JP | 2002-107612 A | | 4/2002 |
| JP | 2002-204379 A | | 7/2002 |
| JP | 2002-229110 A | | 8/2002 |
| JP | 2003-333391 A | | 11/2003 |

* cited by examiner

CAMERA AND IMAGE PICKUP DEVICE UNIT WHICH REDUCE INFLUENCE OF DUST IMAGE QUALITY

This application claims the benefit of Japanese Application No. 2002-153018 filed on May 27, 2002, the entire contents of which are incorporated herein by reference.

BACKGROUND OF THE INVENTION

1. Field of the Invention

The present invention relates to an image pick-up device unit having an image pick-up device for obtaining an image signal corresponding to light irradiated on a photoelectrically converting surface or a camera having the image pick-up device unit. More particularly, the present invention relates to the improvement of a camera, such as an interchangeable single-lens reflex digital camera.

2. Related Background Art

Recently, digital cameras such as a so-called digital still camera or a digital video camera (hereinafter, referred to as a digital camera or simply referred to as a camera) are generally put into practical use and are widely spread. In the digital cameras, a subject image formed subject beams), which are transmitted through a photographing optical system (also referred to as a photographing lens) is formed onto a photoelectrically converting surface of a solid image pick-up device arranged at a predetermined position, such as a CCD (Charge Coupled Device, hereinafter, simply referred to as an image pick-up device). Further, an electrical image signal or the like representing a desired subject image is generated by using an photoelectrically converting action of the image pick-up devices. A signal based on the image signal and the like are outputted to a predetermined display device such as an LCD (Liquid Crystal Display) and an image or the like is displayed. The image signal or the like generated by the image pick-up device is recorded to a predetermined recording area of a predetermined recording medium as predetermined-format image data. Further, the image data recorded to the recording medium is read and the image data is converted to become an image signal which is optimum for a display using the display device. Thereafter, an image corresponding thereto is displayed based on the processed image signal.

In general, digital cameras have an optical finder device for observing, prior to a photographing operation, a desired subject as a photographing target and for setting a photographing range including the subject.

In general, a so-called single-lens reflex finder device is used as the optical finder device. In this single-lens reflex finder device, the advancing direction of the subject beams transmitted through the photographing optical system is bent by using a reflecting member arranged on the optical axis of the photographing optical system such that the subject image for observation is formed at a predetermined position. On the other hand, upon the photographing operation, the reflecting member is evacuated from the optical axis of the photographing optical system, thereby guiding the subject beams onto a light receiving surface of the image pick-up device, that is, onto a photoelectrically converting surface thereof and forming the subject image for photographing on the photographically converting surface.

Furthermore, recently, a so-called interchangeable lens digital camera having the single-lens reflex finder device is generally put into practical use. In the interchangeable lens digital camera, the photographing optical system is detachable to a camera main body, and a plurality of types of the photographing optical systems are selectively used in the single-camera main body by arbitrarily detaching and exchanging a desired photographing optical system in accordance with user's desire.

In the above-mentioned interchangeable lens digital camera, dust and the like floating in the air possibly enter the camera main body upon detaching the photographing optical system from the camera main body. Various mechanisms which are mechanically operated such as a shutter and a stop mechanism are arranged in the camera main body and thus, dust is possibly generated from the various mechanisms during the operation.

Upon detaching the photographing optical system from the camera main body, the light receiving surface (also referred to as the photoelectrically converting surface) of the image pick-up device arranged in the rear of the photographing optical system is exposed in the ambient air of the camera. Therefore, dust and the like are adhered to the photographing converting surface of the image pick-up device due to electric charge action and the like.

Further, the conventional digital camera having the interchangeable lens generally include various optical members, such as a protecting glass for protecting a light receiving surface of the image pick-up device, an optical low-pass filter, and an infrared cut-off filter, in a space between the photoelectrically converting surface and the photographing optical system. Therefore, the above-mentioned dust, etc. is adhered to the surfaces of the various optical members.

In the conventional digital cameras, when the dust, etc. is adhered to the photoelectrically converting surface of the image pick-up device or the surfaces of the various optical members, a part of subject beams which are transmitted through the photographing optical system and which reach the photoelectrically converting surface of the image pick-up device is shielded by the dust, etc. Thus, a predetermined shadow is formed onto the photoelectrically converting surface. Then, the shadow due to the dust, etc. is photographed on the image based on the image signal obtained by the image pick-up device. This causes the deterioration in image quality.

Then, various means as a dust-proofing structure is proposed for the conventional digital cameras. For example, the dust-proofing structure prevents the entering of the dust, etc. in a space between the optical member and the photographically converting surface of the image pick-up device by constituting a sealing space which is sealed from the outside.

However, with the above dust-proofing structure, there is a possibility that dust, etc. can still be adhered to a surface in the foremost part of the unit, namely, on the arrangement side of the photographing optical system as an incident surface of the subject beams after being transmitted through the photographing optical system.

In particular, the digital cameras having the interchangeable lens generally use a focal plane type shutter mechanism arranged near the image pick-up device. However, the focal plane type shutter mechanism has many operating members and therefore dust, etc. is caused by operating the operating members.

Then, for example, Japanese Patent Publication No. 2809133 discloses means by which the image based on the obtained image signal is prevented from an adverse influence due to the adhesion of dust to the surface of the optical members provided in front of the image pick-up device (photoelectrically converting device).

In the image pick-up device unit disclosed in Japanese Patent Publication No. 2809133, the dimension of an interval between a beam incident surface and a light receiving surface (photoelectrically converting surface) of a photoelectrically converting device is regulated by a predetermined condition formula on a package (unit) which seals the photoelectrically converting device (image pick-up device). The dimension of the interval for satisfying the condition formula sets positions of the beam incident surface of the package and the light receiving surface of the photoelectrically converting device.

Consequently, if dust is adhered to the beam incident surface of the package, the influence from the shade formed by the dust to the optical image based on an electrical signal obtained by the photoelectrically converting device is suppressed.

The means disclosed in Japanese Patent Publication No. 2809133 is a technology which is applied to the package of the photoelectrically converting device for focal detection. This means is effective to obtain the optical image for the focal detection without trouble. However, the means cannot be applied to an image pick-up device unit of a camera such as a digital camera for obtaining the image signal indicating an image by the image pick-up device. That is, a trouble can be caused upon displaying the optical image based on the obtained image signal (image), even if the image signal is proper for a focal detecting accuracy.

Further, the means disclosed in Japanese Patent Publication No. 2809133 has the following problems because the size of the dust particles is not considered.

In other words, in the means disclosed in Japanese Patent Publication No. 2809133, the size of a shade formed by the dust, etc. adhered to the beam incident surface of the package is regulated by a predetermined calculating formula. In this case, the size of the shade formed by the dust, etc. is set to be 15 times or more of a pixel interval (pitch) of the photoelectrically converting device. Thus, the influence on the image formed on the light receiving surface of the photoelectrically converting device due to the shade is suppressed.

However, of course, the size of the shade formed by the dust depends on the size of the dust, etc. As the size of the dust increases, the shade is expanded more widely on the photoelectrically converting surface. In this case, the density of the shadow is not decreased. Therefore, the shade adversely influences on the image formed onto the light receiving surface of the photoelectrically converting device. The shade causes the deterioration in picture quality of the image based on the obtained image signal.

Namely, if the beam incident surface of the package is regulated in accordance with the dimension of the distance regulated by the means disclosed in Japanese Patent Publication No. 2809133, the shade formed by the dust adversely influences on the image depending on the size of the dust particles adhered to the beam incident surface.

On the contrary, in the means disclosed in Japanese Patent Publication No. 2809133, upon using the beam incident surface having the dimension of the interval between the beam incident surface of the package and the light receiving surface of the photoelectrically converting device, which is regulated by the above calculation, even when there is a possibility that the shade adversely influence on the image, no trouble can actually be caused depending on the size of the dust particles adhered to the beam incident surface.

The above-mentioned contradiction due to the usage of the means disclosed in Japanese Patent Publication No. 2809133 is caused because the size of the dust particles is not considered in the disclosed means.

SUMMARY OF THE INVENTION

Accordingly, it is an object of the present invention to provide a camera and an image pick-up device unit used for the camera, in which a shade formed by dust, etc. adhered to a surface of an optical member provided in front of an image pick-up device does not exert any adverse influence on an image formed and displayed on an image signal that is obtained by the image pick-up device.

Briefly, according to a first aspect of the invention, a camera comprises: an image pick-up device which obtains an image signal corresponding to beams irradiated onto a photoelectrically converting surface thereof; a photographing lens which inputs a subject image onto the photoelectrically converting surface of the image pick-up device; an image signal processing circuit which converts an image signal obtained from the image pick-up device, corresponding to an image formed onto the photoelectrically converting surface of the image pick-up device, into a signal suitable to recording; a dust-proofing member having a substantially circular or polygonal plate-shape and comprising a transparent portion at an area having at least a predetermined length in a radial direction from a center of the dust-proofing member, wherein the transparent portion is opposed to a front of an optical device at a predetermined interval, and wherein an interval of an equivalent optical path length of at least 5 mm is provided between a surface of the dust-proofing member and the photoelectrically converting surface of the image pick-up device; and a sealing structure portion arranged at a portion formed by opposing the image pick-up device and the dust-proofing member, the sealing structure portion sealing a space portion that is substantially sealed at peripheral portions of the image pick-up device and the dust-proofing member.

According to a second aspect of the invention, a camera comprises: an image pick-up device which obtains an image signal corresponding to beams irradiated onto a photoelectrically converting surface thereof; an optical member having a first surface opposed to a front of the image pick-up device at a predetermined interval; and a sealing structure portion arranged at a portion formed by opposing the image pick-up device and a dust-proofing member, the sealing structure portion sealing a space portion that is substantially sealed at peripheral portions of the image pick-up device and the dust-proofing member, wherein a dimension of an interval between the photoelectrically converting surface of the image pick-up device and a second surface of the optical member is set such that when positioning an object having a diameter of $\frac{1}{10}$ or less of an exit pupil of a photographing lens on the second surface of the optical member, a density of a shade formed onto the photoelectrically converting surface is approximately 5% or less of a density of a shade formed by the object when placing the second surface of the optical member at a position of an equivalent optical path length of 1 mm in air from the photoelectrically converting surface.

According to a third aspect of the invention, an image pick-device unit comprises: an image pick-up device which obtains an image signal corresponding to beams irradiated onto a photoelectrically converting surface thereof; an optical member having a first surface opposed to a front of the image pick-up device at a predetermined interval; and a sealing structure portion arranged at a portion formed by opposing the image pick-up device and a dust-proofing member, and sealing a space portion that is substantially sealed at peripheral portions of the image pick-up device and the dust-proofing member, wherein a condition for preventing formation of an original shade of an object onto a second surface of the optical member is set to establish a relationship of an equivalent optical path length L in air between the object and the photoelectrically converting surface of the image pick-up device, such that: $L > A \times d/D$ where a diameter of an exit pupil of a photographing lens is designated by $\phi D$, a diameter of the object is by $\phi d$, and an equivalent optical path length in air from a position of the exit pupil to the photographing converting surface of the image pick-up device is designated by A.

According to a forth aspect of the invention, an image pick-up device unit comprises: an image pick-up device which obtains an image signal corresponding to beams irradiated onto a photoelectrically converting surface thereof; an optical member having a first surface opposed to a front of the image pick-up device at a predetermined interval; and a sealing structure portion arranged at a portion formed by opposing the image pick-up device and a dust-proofing member, the sealing structure portion sealing a space portion that is substantially sealed at peripheral portions of the image pick-up device and the dust-proofing member, wherein an interval between the photoelectrically converting surface of the image pick-up device and a second surface of the optical member is set to have a dimension of an interval for preventing the formation of an original shade of an object on the second surface of the optical member onto the photoelectrically converting surface of the image pick-up device.

According to a fifth aspect of the invention, a camera comprises: a photographing lens; an image pick-up device which obtains an image signal corresponding to beams irradiated onto a photoelectrically converting surface thereof; an optical member having a first surface opposed to a front of the image pick-up device at a predetermined interval; and a sealing structure portion arranged at a portion formed by opposing the image pick-up device and a dust-proofing member, the sealing structure portion sealing a space portion that is substantially sealed at peripheral portions of the image pick-up device and the dust-proofing member, wherein an interval between the photoelectrically converting surface of the image pick-up device and a second surface of the optical member is set to have a dimension of an interval for preventing formation of an original shade of an object onto the second surface of the optical member onto the photoelectrically converting surface of the image pick-up device.

The above-mentioned and other objects and benefits of the present invention will be obvious from the following detailed description.

According to the present invention, there are provided the camera and the image pick-up device unit used for the camera, in which the shade formed by dust, etc. adhered to the surface of the optical member provided in front of the image pick-up device does not exert any adverse influence on the image formed and displayed based on the image signal that is obtained by the image pick-up device.

DESCRIPTION OF THE PREFERRED EMBODIMENTS

First, a description is given of the schematic structure of a camera according to a first embodiment of the present invention.

Figure 1:
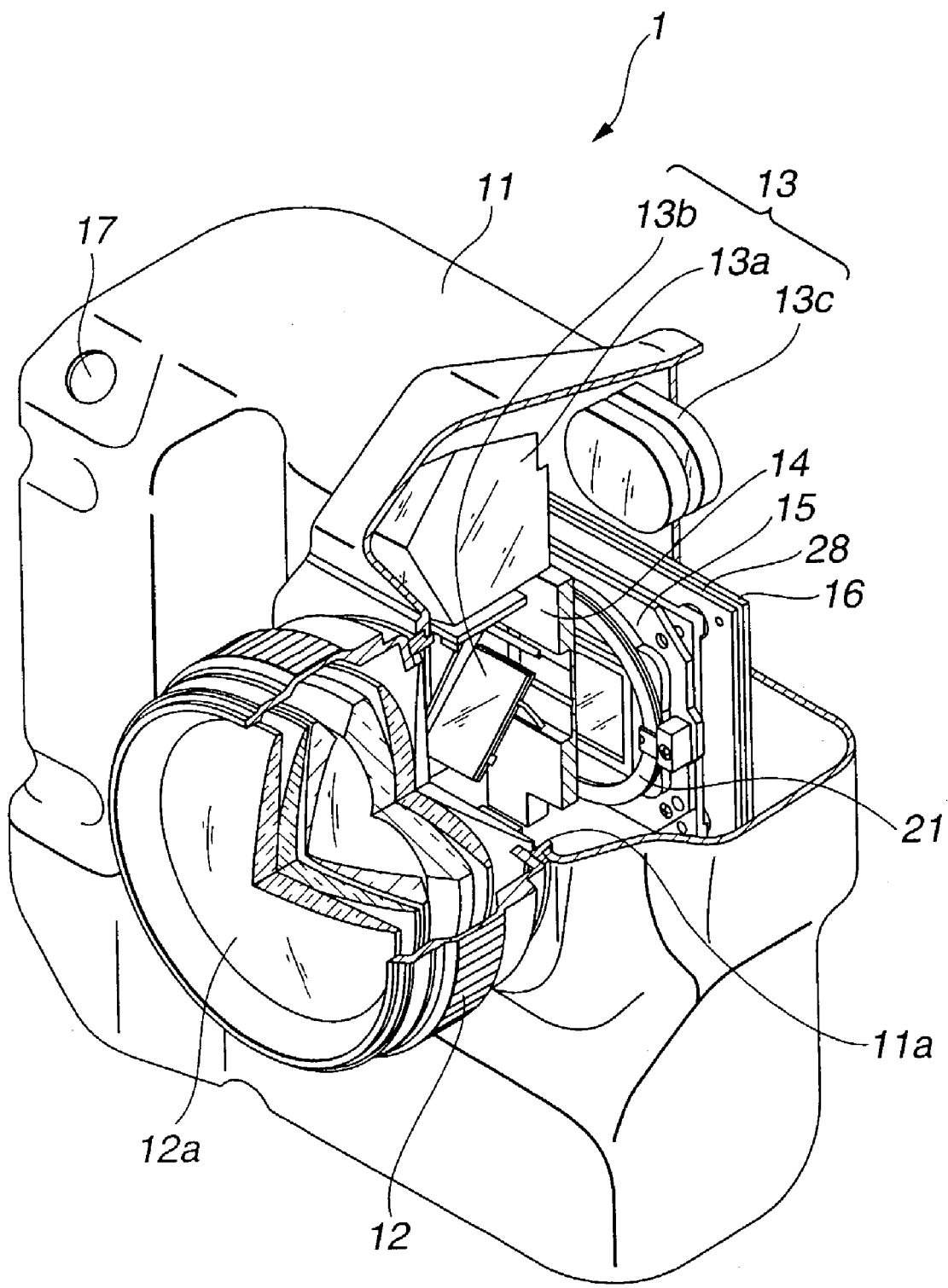
FIG. 1 is a perspective view schematically showing the internal structure of a camera by cutting off a part of the camera according to a first embodiment of the present invention.
Figure 2:
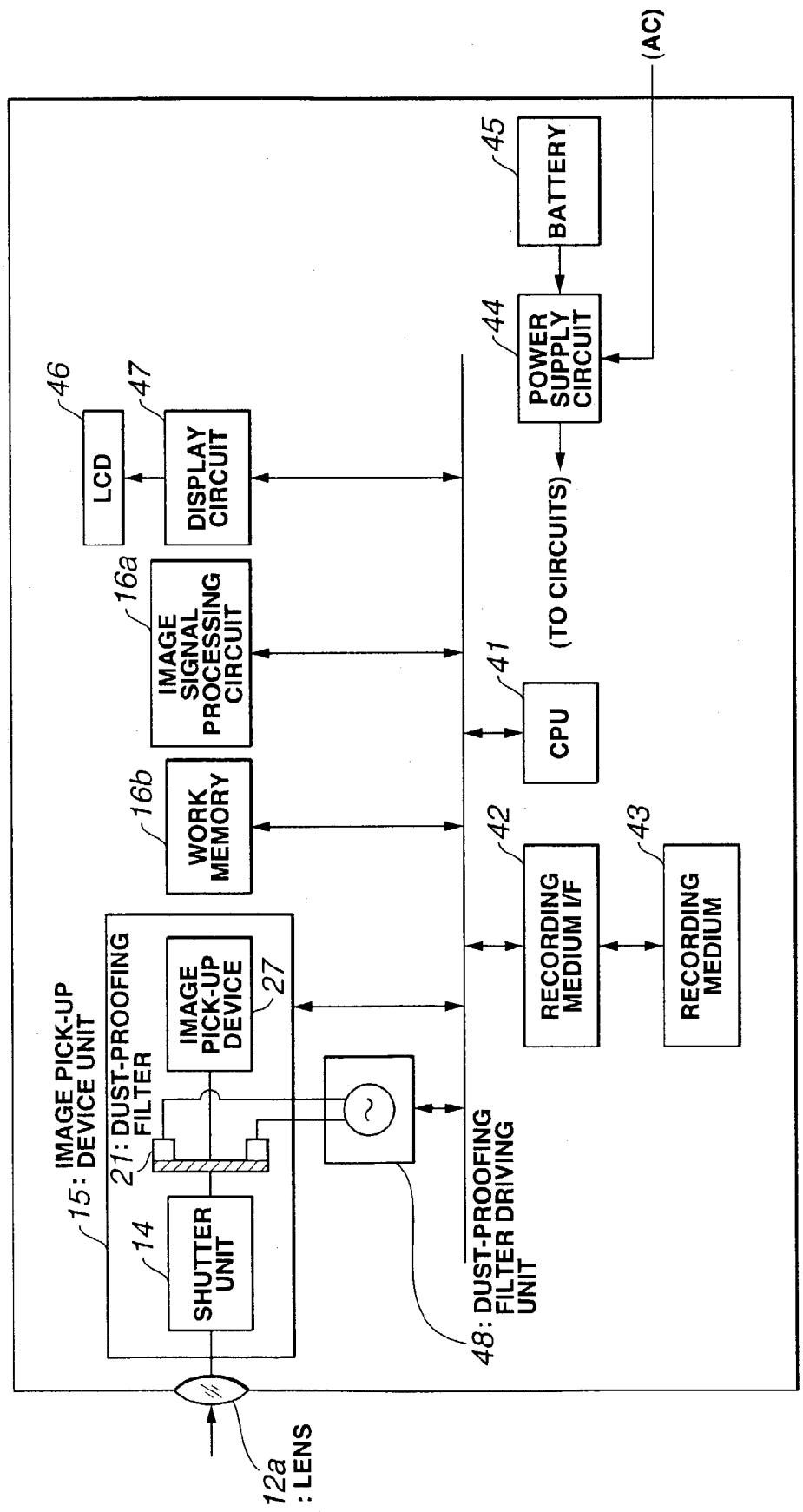
FIG. 2 is a block diagram schematically showing mainly the electrical structure of the camera shown in FIG. 1.

FIGS. 1 and 2 are diagrams showing the schematic structure of the camera according to the first embodiment of the present invention. FIG. 1 is a perspective view schematically showing the internal structure of a cut-off part of the camera, and FIG. 2 is a block diagram schematically showing the main electrical structure of the camera.

According to the first embodiment, a camera 1 comprises a camera main body unit 11 and a lens barrel 12 which are provided separately. The camera main body unit 11 and the lens barrel 12 are detachable from each other.

Figure 5:
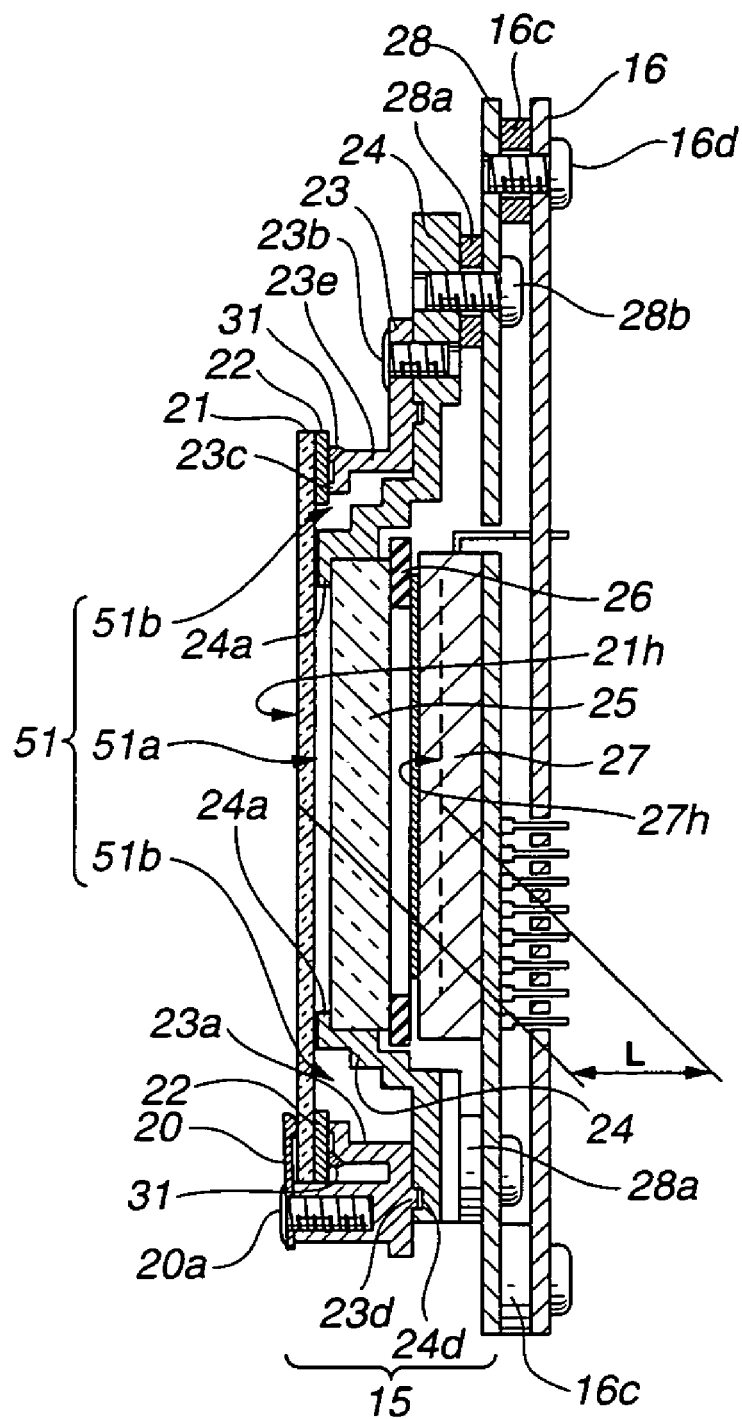
FIG. 5 is a sectional view along a cut-off plane of FIG. 4.

The lens barrel 12 holds a photographing optical system (photographing lenses) 12a comprising a plurality of lenses and a driving mechanism of the lenses. The photographing optical system 12a comprises a plurality of optical lenses for forming a subject image formed by subject beams by transmitting the beams from a subject at a predetermined position (at a predetermined position on a photoelectrically converting surface 27h of an image pick-up device 27, which will be described later. Refer to FIG. 5). The lens barrel 12 is projected toward the front side of the camera main body unit 11.

The lens barrel 12 is a generally-used type used in conventional cameras. Therefore, a description of the detailed structure is omitted.

The camera main body unit 11 is a so-called single-lens reflex camera comprising various members therein, and further having a photographing optical system attaching unit (referred to as a photographing lens attaching unit) 11a in front thereof as a connecting member for detachably arranging the lens barrel 12 for holding the photographing optical system 12a.

In other words, an opening for exposure having a predetermined diameter for guiding the subject beams in the camera main body unit 11 is formed substantially in the center in front of the camera main body unit 11. The photographing optical system attaching unit 11a is formed at a peripheral portion of the opening for exposure.

The above-mentioned photographing optical system attaching unit 11a is arranged in front of an outer-surface side of the camera main body unit 11. In addition, various operating members for operating the camera main body unit 11, e.g., a release button 17 for generating an instruction signal to start the photographing operation and the like are arranged at a predetermined position on an upper-surface portion or a back-surface portion of the camera main body unit 11. Since the operating members do not directly relate to the present invention, a description and an illustration of the operating members except for the release button 17 are omitted for the purpose of preventing the complication of the drawing.

Referring to FIG. 1, in the camera main body unit 11, various members are arranged at predetermined positions. For example, the camera main body unit 11 comprises: a finder device 13 forming a so-called observation optical system, provided for forming a desired subject image formed by the photographing optical system 12a at a predetermined position different from that on the photoelectrically converting surface 27h (refer to FIG. 5) of the image pick-up device 27 (refer to FIG. 2); a shutter unit 14 having a shutter mechanism and the like for controlling an irradiation time and the like of the subject beams onto the photoelectrically converting surface 27h of the image pick-up device 27; an image pick-up device unit 15 as an assembly, including the shutter unit 14, the image pick-up device 27 for obtaining an image signal corresponding to the subject image formed based on the subject beams which are transmitted through the photographing optical system 12a, and a dust-proofing filter 21 (which will be described in detail later) having optical members, etc., as a dust-proofing member for preventing the adhesion of the dusts and the like to the photoelectrically converting surface 27h of the image pick-up device 27, arranged at a predetermined position in front of the photoelectrically converting surface 27h; and a plurality of circuit boards (only a main circuit board 16 is illustrated in FIG. 1) such as a main circuit board 16 on which various electrical members constituting an electrical circuit, e.g., an image signal processing circuit 16a (refer to FIG. 2) for various signal processing to the image signal obtained by the image pick-up device 27, are mounted.

The finder device 13 comprises a reflecting mirror 13b for bending and guiding an optical axis of the subject beams transmitted through the photographing optical system 12a to an observation optical system, a roof prism 13a for receiving the beams outputted from the reflecting mirror 13b and for forming an erecting image, an ocular lens 13c for enlarging the image formed by the roof prism 13a and for forming an image optimum for observation, and the like.

The reflecting mirror 13b is movable between a position evacuating from the optical axis of the photographing optical system 12a and a predetermined position on the optical axis, and is arranged at a predetermined angle, e.g., 45° with respect to the optical axis of the photographing optical system 12a in a normal status. Thus, the optical axis of the subject beams transmitted through the photographing optical system 12a is bent by the reflecting mirror 13b when the camera 1 is in the normal status, and is reflected to the roof prism 13a arranged in an upper direction of the reflecting mirror 13b.

Upon executing the photographing operation of the camera 1, the reflecting mirror 13b is moved to a predetermined position evacuated from the optical axis of the photographing optical system 12a during the actual exposure operation. Consequently, the subject beams are guided to the image pick-up device 27 side and irradiate the photoelectrically converting surface 27h.

The shutter unit 14 applies a focal plane type shutter mechanism, driving circuit for controlling the operation of the shutter mechanism, etc. which are generally used in the conventional cameras. Therefore, a description of the detailed structure is omitted.

As mentioned above, a plurality of circuit boards are arranged in the camera 1, and form various electrical circuits. Referring to FIG. 2, as the electrical structure, the camera 1 comprises: a CPU 41 as a control circuit for systematically controlling the entire camera 1; the image signal processing circuit 16a for performing various signal processing such as signal processing for converting the image signal obtained by the image pick-up device 27 into a signal suitable to a recording format; a work memory 16b for temporarily recording the image signal and image data processed by the image signal processing circuit 16a and various information in associated therewith; a recording medium 43 for recording the image data for recording in a predetermined format generated by the image signal processing circuit 16a to a predetermined area; a recording medium interface 42 for electrically connecting the recording medium 43 to the electrical circuits of the camera 1; a display unit 46 comprising a liquid crystal display device (LCD) for displaying the image; a display circuit 47 for electrically connecting the display unit 46 to the camera 1, receiving the image signal processed by the image signal processing circuit 16a, and generating an image signal for display optimum to the display operation by using the display unit 46; a battery 45 comprising a secondary battery such as a dry cell; a power supply circuit 44 for receiving power from the battery 45 or from external power supply (AC) supplied by a predetermined connection cable (not shown), controlling the power to match the operation of the camera 1, and supplying electricity to the electrical circuits; and a dust-proofing member driving unit 48 as the electrical circuit for driving the dust-proofing filter 21 included in the image pick-up device unit 15, comprising an oscillator, and the like.

Next, a detailed description is given of the image pick-up device unit 15 in the camera 1 according to the first embodiment.

Figure 3:
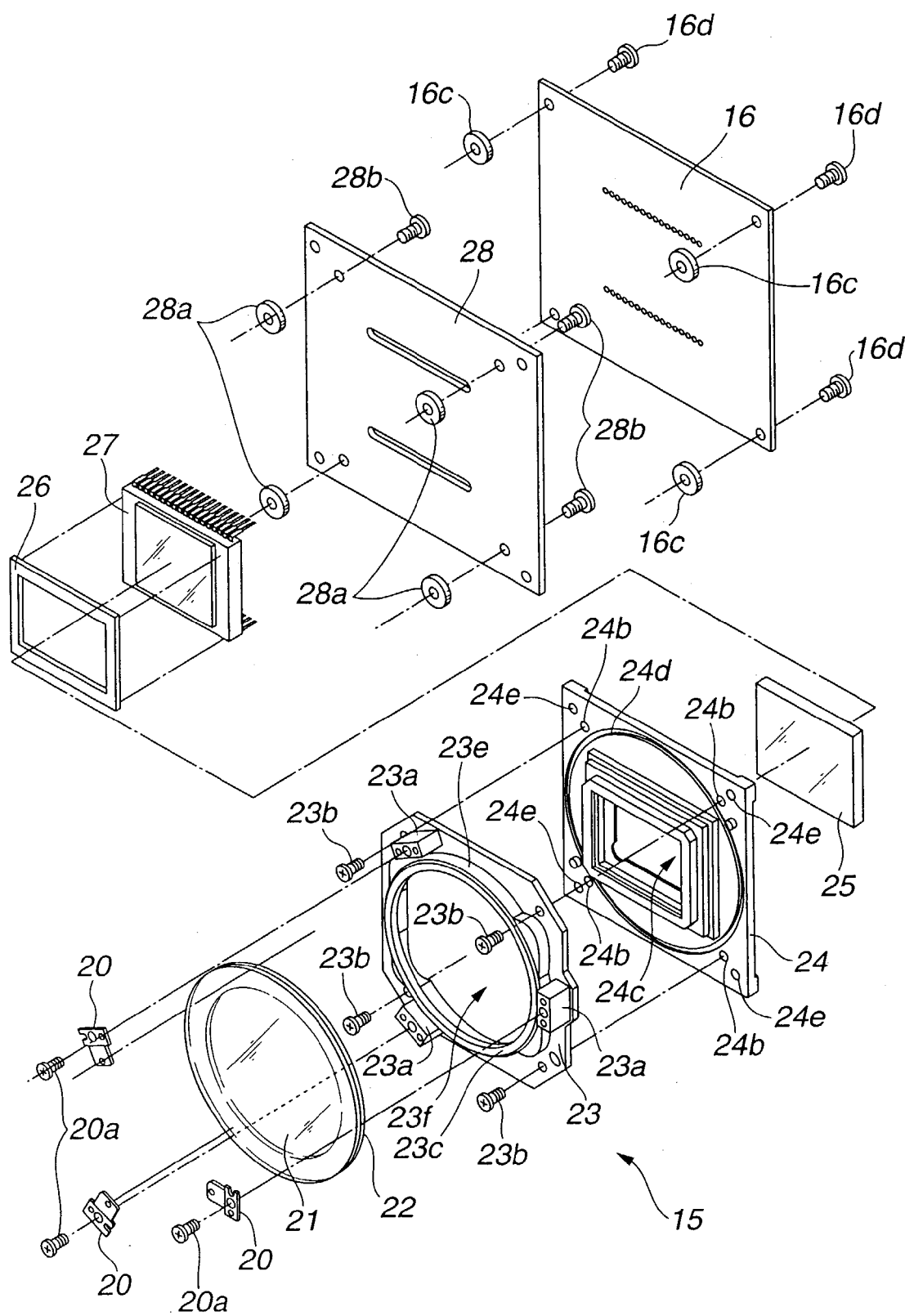
FIG. 3 is a diagram showing by extracting a part of an image pick-up device unit in the camera shown in FIG. 1, that is, a main-part exploded perspective view showing the disassembled image pick-up device unit.
Figure 4:
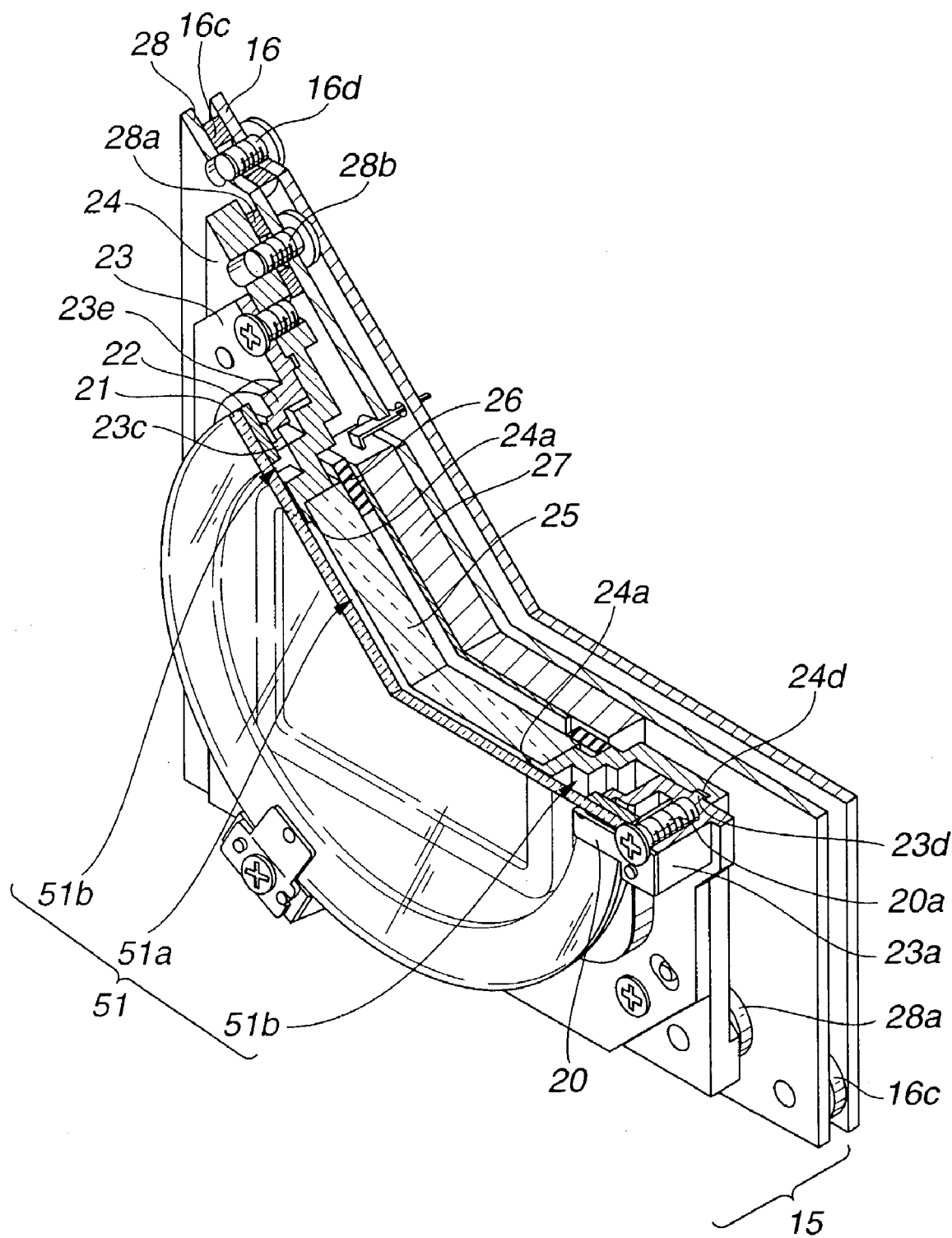
FIG. 4 is a perspective view showing a cut-off part of the assembled image pick-up device unit in the camera shown in FIG. 1.

FIGS. 3 to 5 are diagrams showing by extracting a part of the image pick-up device unit in the camera 1 according to the first embodiment. FIG. 3 is a main-part exploded perspective view showing the schematic structure of the disassembled image pick-up device unit. FIG. 4 is a perspective view showing a cut-off part of the assembled image pick-up device unit. FIG. 5 is a sectional view along a cut-off plane shown in FIG. 4.

According to the first embodiment, as mentioned above, the image pick-up device unit 15 in the camera 1 is a unit comprising a plurality of members such as the shutter unit 14. However, referring to FIGS. 3 to 5, the main portion is only shown and an illustration of the shutter unit 14 is omitted. For the purpose of showing a positional relationship of the members, referring to FIGS. 3 to 5, the image pick-up device 27 is loaded while the members are provided near the image pick-up device unit 15, and the main circuit board 16 on which the image pick-up system electrical circuits comprising the image signal processing circuit 16a and the work memory 16b are mounted is illustrated. The main circuit board 16 is one of main circuit boards generally used in the conventional cameras, and a detailed description thereof is omitted.

The image pick-up device unit 15 comprises: the image pick-up device 27 comprising the CCD and the like, which obtains the image signal corresponding to the light transmitted through the photographing optical system 12a and irradiated to the photoelectrically converting surface 27h thereof; the image pick-up device fixing plate 28 comprising a thin-sheet member for fixing and supporting the image pick-up device 27; an optical low-pass filter (hereinafter, referred to as an optical LPF) 25 arranged on the side of the photoelectrically converting surface 27h of the image pick-up device 27, as an optical device which is formed to remove high frequency components from the subject beams transmitted and irradiated through the photographing optical system 12a; a low-pass filter supporting member 26 provided in the periphery between the optical LPF 25 and the image pick-up device 27, which is made of substantially-frame-shaped elastic members; an image pick-up device accommodating case member 24 (hereinafter, referred to as a CCD case 24) which accommodates, fixes, and holds the image pick-up device 27, supports the optical LPF 25 (optical device) in contact with a peripheral portion or an adjacent portion of the optical LPF 25 and which comes into closely contact with a dust-proofing filter supporting member 23, which will be described later, at a predetermined portion; the dust-proofing filter supporting member 23 which is arranged in front of the CCD case 24 and comes into contact with a dust-proofing filter 21 (dust-proofing member) at a peripheral portion or an adjacent portion thereof and supports it; the dust-proofing filter 21 as a dust-proofing member, which is supported by the dust-proofing filter supporting member 23 and which is arranged at a predetermined position, at a predetermined interval to the optical LPF 25, in the front of the optical LPF 25 on the side of the photoelectrically converting surface 27h of the image pick-up device 27; a piezoelectric element 22 annularly arranged at a peripheral portion of the dust-proofing filter 21 for applying predetermined vibrations to the dust-proofing filter 21, and which comprises an electromechanical transducing device such as a piezoelectric ceramic; a pressing member 20 comprising an elastic member which airtightly joints the dust-proofing filter 21 to the dust-proofing filter supporting member 23; and the like.

The image pick-up device 27 obtains the image signal corresponding to the subject image formed onto the photoelectrically converting surface 27h thereof by receiving the subject beams transmitted through the photographing optical system 12a onto the photoelectrically converting surface thereof and by performing photoelectrically converting processing, and applies a CCD (Charge Coupled Device) for it, for example.

The image pick-up device 27 is mounted at a predetermined position on the main circuit board 16 with the image pick-up device fixing plate 28 interposed therebetween. As mentioned above, the image signal processing circuit 16a, the work memory 16b, etc. are mounted on the main circuit board 16 such that an output signal from the image pick-up device 27, that is, the image signal obtained by the photoelectrically converting processing is electrically transmitted to the image signal processing circuit 16a or the like.

The signal processing in the image signal processing circuit 16a includes various signal processing, for example, processing in which the image signal obtained from the image pick-up device 27, as the one corresponding to the image formed onto the photoelectrically converting surface 27h of the image pick-up device 27 by the photographing optical system 12a held in the lens barrel 12 loaded to the photographing optical system attaching unit 11a, is converted into a signal matching the recording. The above-mentioned signal processing is the same as processing for treating a digital image signal, which is commonly performed in the general digital cameras. Therefore, a detailed description of various signal processing which is usually executed in the camera 1 is omitted.

The optical LPF 25 is arranged in front of the image pick-up device 27 with being sandwiched by the low-pass filter supporting member 26 therebetween. The CCD case 24 is arranged to cover the optical LPF 25.

That is, an opening 24c which is rectangular-shaped and substantially in the center is provided for the CCD case 24. The optical LPF 25 and the image pick-up device 27 are arranged from the back side of the opening 24c. Referring to FIGS. 4 and 5, a step portion 24a whose cross section is substantially L-shaped is formed at an inner peripheral portion of the back side of the opening 24c.

As mentioned above, the low-pass filter supporting member 26 made of the elastic member or the like is arranged between the optical LPF 25 and the image pick-up device 27. In the peripheral portion in front of the image pick-up device 27, the low-pass filter supporting member 26 is arranged at a position for evacuating a valid range of the beams incident on the photoelectrically converting surface 27h at the periphery of the image pick-up device 27 in the front thereof, and is abutted onto an adjacent portion of the periphery behind the optical LPF 25. The airtightness is substantially held between the optical LPF 25 and the image pick-up device 27. Thus, elastic force generated by the low-pass filter supporting member 26 acts to the optical LPF 25 in the optical axis direction.

Then, the peripheral portion in front of the optical LPF 25 airtightly comes into contact with the step portion 24a of the CCD case 24. Thus, the position of the optical LPF 25 in the optical axis direction is regulated against the elastic force which is generated by the low-pass filter supporting member 26 and tends to displace the optical LPF 25 in the optical axis direction.

In other words, the optical LPF 25 inserted from the back side into the opening 24c of the CCD case 24 is subjected to the position regulation in the optical direction by the step portion 24a. Consequently, it is possible to prevent the optical LPF 25 from breaking away from the inside of the CCD case 24 to the front side.

As mentioned above, after inserting the optical LPF 25 in the opening 24c of the CCD case 24 from the back side, the image pick-up device 27 is arranged on the back side of the optical LPF 25. In this case, the low-pass filter supporting member 26 is sandwiched between the optical LPF 25 and the image pick-up device 27 in the peripheral portion.

Further, as mentioned above, the image pick-up device 27 is mounted on the main circuit board 16 via the image pick-up device fixing plate 28 interposed. The image pick-up device fixing plate 28 is fixed to a screw hole 24e from the back of the CCD case 24 by a screw 28b via a spacer 28a interposed. The main circuit board 16 is also fixed to the image pick-up device fixing plate 28 by a screw 16d via a spacer 16c interposed.

In front of the CCD case 24, the dust-proofing filter supporting member 23 is fixed to the screw hole 24b of the CCD case 24 by a screw 23b. In this case, a circumferential groove 24d is substantially annularly formed at a predetermined position in front of the CCD case 24 in the peripheral side thereof, as will be described in detail in FIGS. 4 and 5. On the other hand, at a predetermined position on the back and the peripheral side of the dust-proofing filter supporting member 23, an annular convex portion 23d (not shown in FIG. 3) corresponding to the circumferential groove 24d of the CCD 24 is formed throughout the circumference with a substantially annular shape. Therefore, by fitting the annular convex portion 23d to the circumferential groove 24d, the CCD case 24 and the dust-proofing filter supporting member 23 are substantially airtightly fit mutually to in an annular area, that is, in an area in which the circumferential groove 24d and the annular convex portion 23d are formed.

The dust-proofing filter 21 is an optical member which is circularly or polygonally plate-shaped as a whole, wherein at least an area having a predetermined length in a radial direction from the center of the dust-proofing filter 21 is formed into a transparent portion. The transparent portion is an optical member which is arranged and opposed at the front of the optical LPF 25 at a predetermined interval.

At the peripheral portion of one surface of the dust-proofing filter 21 (at the back surface side thereof according to the first embodiment), the piezoelectric element 22 as the predetermined member for vibration comprising an electromechanical transducing device for vibrating the dust-proofing filter 21 is integrally formed, by using adhering means such as an adhesive. The piezoelectric element 22 applies predetermined vibrations to the dust-proofing filter 21 by applying a predetermined driving voltage from the outside.

The dust-proofing filter 21 is fixed and held by the pressing member 20 made of the elastic member such as a plate-shaped spring so as to airtightly joint to the dust-proofing filter supporting member 23.

A circular or polygonal opening 23f is provided substantially in the center of the dust-proofing filter supporting member 23. The opening 23f is set to a size large enough to have the subject beams which are transmitted through the photographing optical system 12a pass through, and to irradiate the photoelectrically converting surface 27h of the image pick-up device 27 arranged at the back.

A wall portion 23e (refer to FIGS. 4 and 5) projecting toward the front side is annularly formed at a peripheral portion of the opening 23f. Further, a supporting portion 23c is formed such that it projects further toward the front side at the edge of the wall portion 23e.

A plurality of (three, according to the first embodiment) projecting portions 23a with a substantially rectangular shape are formed to project toward the front side, near an outer peripheral portion in front of the dust-proofing filter supporting member 23. The projecting portions 23a are portions formed to fix the pressing member 20 for fixing and holding the dust-proofing filter 21. The pressing member 20 is fixed by fastening means such as fixing screws 20a to the edges of the projecting portions 23a.

The pressing member 20 is a member made of the elastic member such as a plate spring, and a basic end portion of the pressing member 20 is fixed to the projecting portion 23a. Further, a free end portion thereof is abutted on an outer peripheral portion of the dust-proofing filter 21, thereby pressing the dust-proofing filter 21 toward the side of the dust-proofing filter supporting member 23, that is, in the optical axis direction.

In this case, a predetermined portion of the piezoelectric element 22 arranged at the outer peripheral portion at the back of the dust-proofing filter 21 is abutted onto the supporting portion 23c, thereby regulating the positions of the dust-proofing filter 21 and the piezoelectric element 22 in the optical axis direction. Therefore, the dust-proofing filter 21 is fixed and held to be airtightly jointed to the dust-proofing filter supporting member 23 with the piezoelectric element 22 interposed therebetween.

In other words, the dust-proofing filter supporting member 23 is airtightly jointed to the dust-proofing filter 21 via the piezoelectric element 22 interposed by a pressing force generated by the pressing member 20.

As mentioned above, with respect to the dust-proofing filter supporting member 23 and the CCD case 24, the circumferential groove 24d and the annular convex portion 23d (refer to FIGS. 4 and 5) are substantially airtightly fixed. Further, the dust-proofing filter supporting member 23 is airtightly jointed to the dust-proofing filter 21 via the piezoelectric element 22 interposed by the pressing force generated by the pressing member 20. The optical LPF 25 arranged to the CCD case 24 is substantially airtightly arranged between the peripheral portion in front of the optical LPF 25 and the step portion 24a of the CCD case 24. Further, the image pick-up device 27 is arranged at the back of the optical LPF 25 via the low-pass filter supporting member 26 interposed. The airtightness is substantially held also between the optical LPF 25 and the image pick-up device 27.

Therefore, in a space formed by opposing the optical LPF 25 and the dust-proofing filter 21, a predetermined void portion 51a is formed. A space portion 51b is formed on the peripheral side of the optical LPF 25, that is, by the CCD case 24, the dust-proofing filter supporting member 23, and the dust-proofing filter 21. The space portion 51b is a sealed space formed projecting toward the outside of the optical LPF 25 (refer to FIGS. 4 and 5). Further, the space portion 51b is set to be wider than the void portion 51a. A space containing the void portion 51a and the space portion 51b becomes a sealing space 51 which is substantially airtightly sealed by the CCD case 24, the dust-proofing filter supporting member 23, the dust-proofing filter 21, and the optical LPF 25 as mentioned above.

As mentioned above, according to the first embodiment, the image pick-up device unit 15 in the camera has the sealing structure portion forming the sealing space 51 which is substantially sealed and which is formed at the peripheral portions of the optical LPF 25 and the dust-proofing filter 21, including the void portion 51a. The sealing structure portion is arranged to the outside the peripheral portion or the adjacent portion of the optical LPF 25.

Namely, according to the first embodiment, the sealing structure portion further comprises the dust-proofing filter supporting member 23 for supporting the dust-proofing filter 21 in contact with the peripheral portion or the adjacent portion thereof, the CCD case 24 which supports the optical LPF 25 in contact with the peripheral portion or the adjacent portion thereof and which is arranged airtightly in contact with the dust-proofing filter supporting member 23 at the predetermined portion of the CCD case 24, and the like. That is, the dust-proofing filter 21 functions as a protecting glass which protects the front side of the image pick-up device 27 and which forms a part of the sealing structure portion.

According to the first embodiment, the camera with the above-mentioned structure is constructed such that the dust-proofing filter 21 is opposed to a predetermined position in front of the image pick-up device 27, and the sealing space 51 is sealed at the peripheries of the photoelectrically converting surface 27h of the image pick-up device 27 and the dust-proofing filter 21. Consequently, the adhesion of dust, etc. to the photoelectrically converting surface 27h of the image pick-up device 27 is prevented.

In this case, by applying a periodic voltage to the piezoelectric element 22 arranged integrally with the peripheral portion of the dust-proofing filter 21 and by applying predetermined vibrations to the dust-proofing filter 21, dust and the like to be adhered to an exposure surface (refer to reference numeral 21h shown in FIG. 5) in front of the dust-proofing filter 21 are removed.

Figure 6:
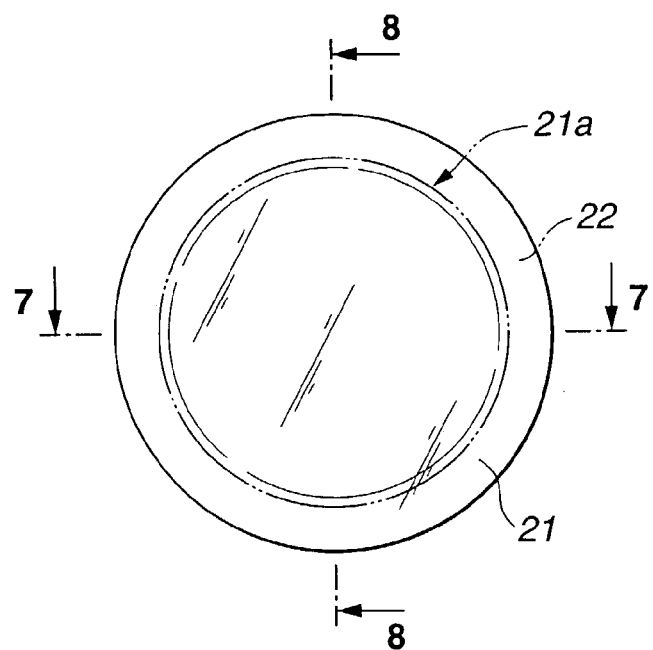
FIG. 6 is a front view showing by extracting only a dust-proofing filter and a piezoelectric element integrated with the dust-proofing filter in the image pick-up device unit in the camera shown in FIG. 1.
Figure 7:
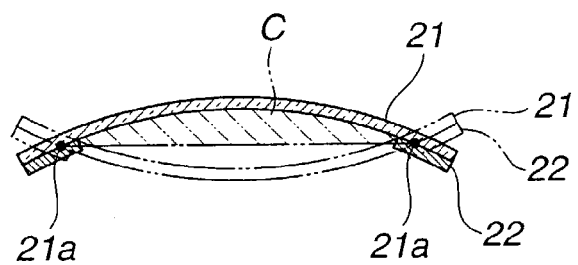
FIG. 7 is a sectional view along a line 7—7 shown in FIG. 6, namely showing one example of the change in status of the dust-proofing filter and the piezoelectric element upon applying a voltage to the piezoelectric element shown in FIG. 6.
Figure 8:
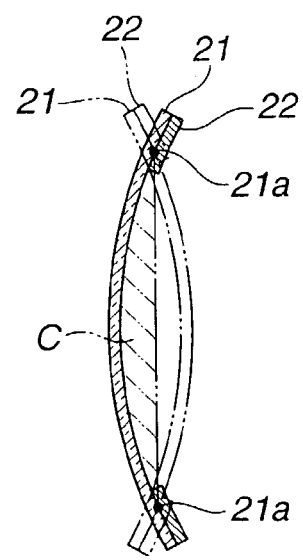
FIG. 8 is a sectional view along a line 8—8 shown in FIG. 6, namely showing another example of the change in status of the dust-proofing filter and the piezoelectric element upon applying the voltage to the piezoelectric element shown in FIG. 6.

FIG. 6 is a front view showing by extracting only the dust-proofing filter 21 and the piezoelectric element 22 arranged integrally therewith in the image pick-up device unit 15 in the camera 1. FIGS. 7 and 8 shows the change in status of the dust-proofing filter 21 and the piezoelectric element 22 upon applying a driving voltage to the piezoelectric element 22 shown in FIG. 6. FIG. 7 is a sectional view along a line 7—7 shown in FIG. 6, and FIG. 8 is a sectional view along a line 8—8 shown in FIG. 6.

When a negative (−) voltage is applied to the piezoelectric element 22, the dust-proofing filter 21 is modified as shown by a solid line in FIGS. 7 and 8. On the other hand, when a positive (+) voltage is applied to the piezoelectric element 22, the dust-proofing filter 21 is modified as shown by a dotted line in FIGS. 7 and 8.

In this case, an amplitude is substantially equal to zero at a node upon vibrations as shown by reference symbol 21a shown in FIGS. 6 to 8. Thus, the supporting portion 23c of the dust-proofing filter supporting member 23 is abutted onto a portion corresponding to the node 21a. Consequently, the dust-proofing filter 21 is efficiently supported without reducing the vibrations.

In this status, the dust-proofing filter driving unit 48 is controlled at a predetermined timing and the periodic voltage is applied to the piezoelectric element 22, thereby vibrating the dust-proofing filter 21. Thus, it is possible to remove dust and the like adhered to the surface of the dust-proofing filter 21.

A resonant frequency in this case is determined depending on the plate thickness, the material, and the shape of the dust-proofing filter 21. In one example shown in FIGS. 6 to 8, a first-degree vibration is generated, however, the present invention is not limited to this, and a high-degree vibration may be generated.

Figure 9:
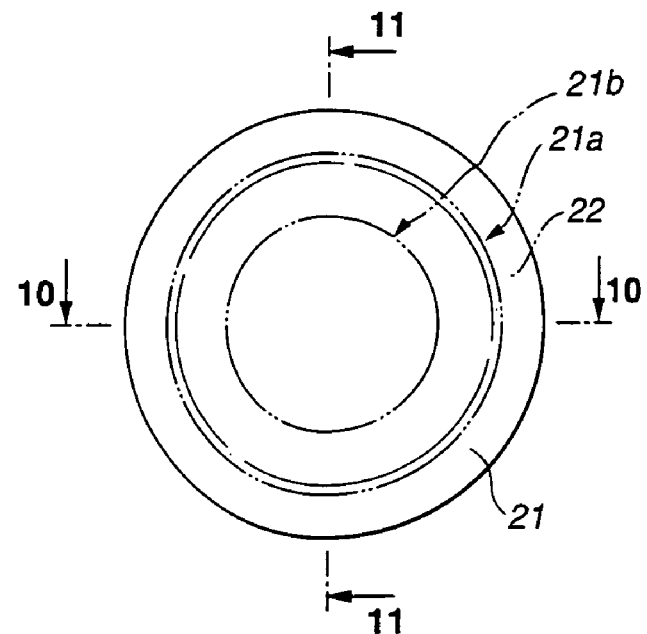
FIG. 9 is a front view showing by extracting only the dust-proofing filter and the piezoelectric element integrated with the dust-proofing filter in the image pick-up device unit in the camera shown in FIG. 1.
Figure 10:
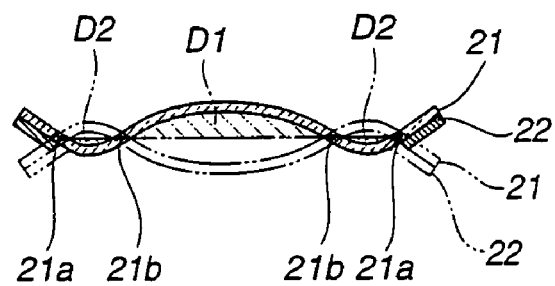
FIG. 10 is a sectional view along a line 10—10 shown in FIG. 9, namely showing another example of the change in status in the dust-proofing filter and the piezoelectric element upon applying the voltage to the piezoelectric element shown in FIG. 9.
Figure 11:
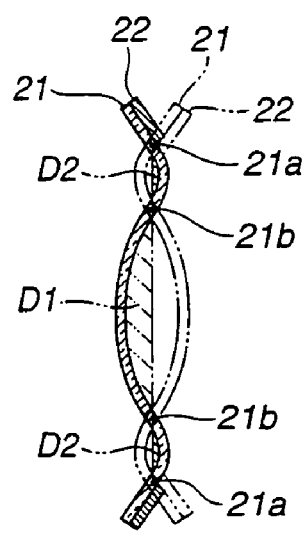
FIG. 11 is a sectional view along a line 11—11 shown in FIG. 9, namely showing another example of the change in status of the dust-proofing filter and the piezoelectric element upon applying the voltage to the piezoelectric element shown in FIG. 9.

In another example shown in FIGS. 9 to 11, a second-degree vibration is generated to the dust-proofing filter with the same structure as the example shown in FIGS. 6 to 8.

In this case, FIG. 9 is a front view showing by extracting only the dust-proofing filter 21 and the piezoelectric element 22 arranged integrally therewith among members in the image pick-up device unit 15 in the camera 1, similarly to FIG. 6. FIGS. 10 and 11 show the change in status of the dust-proofing filter 21 and the piezoelectric element 22 when the voltage is applied to the piezoelectric element 22 shown in FIG. 9. FIG. 10 is a sectional view along a line 10—10 shown in FIG. 9. FIG. 11 is a sectional view along a line 11—11 shown in FIG. 9.

Herein, when a negative (−) voltage is applied to the piezoelectric element 22, the dust-proofing filter 21 is modified as shown by a solid line in FIGS. 10 and 11. On the other hand, when a positive (+) voltage is applied to the piezoelectric element 22, the dust-proofing filter 21 is modified as shown by a dotted line in FIGS. 10 and 11.

In this case, as shown by reference symbols 21a and 21b shown in FIGS. 9 to 11, the vibration has two pairs of nodes. By setting the supporting portion 23c of the dust-proofing filter supporting member 23 such that it is abutted onto a portion corresponding to the node 21a, the dust-proofing filter 21 is efficiently supported without reducing the vibration similarly to the above-described example shown in FIGS. 6 to 8.

In this status, the dust-proofing filter driving unit 48 is controlled at a predetermined timing and the periodic voltage is applied to the piezoelectric element 22, thereby vibrating the dust-proofing filter 21. Thus, it is possible to remove dust and the like adhered to the surface of the dust-proofing filter 21.

When the first-degree vibration is generated as shown in FIGS. 6 to 8, in the sealing space 51, the amplitude of the dust-proofing filter 21 generates the change in volume shown by reference symbol C. As shown in FIGS. 9 to 11, when the second-degree vibration is generated, the change in volume of the sealing space 51 generated by the amplitude of the dust-proofing filter 21 corresponds to the amount obtained by subtracting an area shown by a reference symbol D2×2 from an area shown by a reference symbol D1, that is, [D1−(D2×2)].

The smaller the change in volume to the sealing space 51 is, the smaller the change in inner pressure is in the sealing space 51. Therefore, it will be understood that the smaller the change in volume of the sealing space 51 is, the vibration can more efficiently be obtained. Thus, in view of the efficiency of the electromechanical transducing, it is preferable that the generated vibration is set in a high-degree mode.

As mentioned above, in the image pick-up device unit 15 of the camera 1 according to the first embodiment, the action of the piezoelectric element 22 for applying predetermined vibrations to the dust-proofing filter 21 causes dust adhered to the surface in front of the dust-proofing filter 21, namely, on a surface 21h on the side opposed to the photographing optical system 12a (refer to FIG. 5) to be shaken off. Most of the dust adhered to the surface 21h of the dust-proofing filter 21 is shaken off by the vibrations. However, some of the dust is not necessarily removed in this case. In particular, minute dust particles having a small mass are hardly removed because they are not shaken off by inertia force of the vibrations.

Here, the dust-proofing filter 21 is arranged at a predetermined position in a space between the photographing optical system 12a and the image pick-up device 27 on an optical path of the photographing optical system 12a. Therefore, the beams from the subject reach the photoelectrically converting surface 27h of the image pick-up device 27 via the photographing optical system 12a and the dust-proofing filter 21 and form an optical image on the photoelectrically converting surface 27h. In this status, an operation for obtaining the image signal is executed by driving the image pick-up device 27.

In this status, when dust is adhered to the surface 21h of the dust-proofing filter 21, the shade formed by the dust is formed on the photoelectrically converting surface 27h of the image pick-up device 27. Then, the shade formed by the dusts is photographed on a display image formed based on the image signal obtained in this case.

Figure 12:
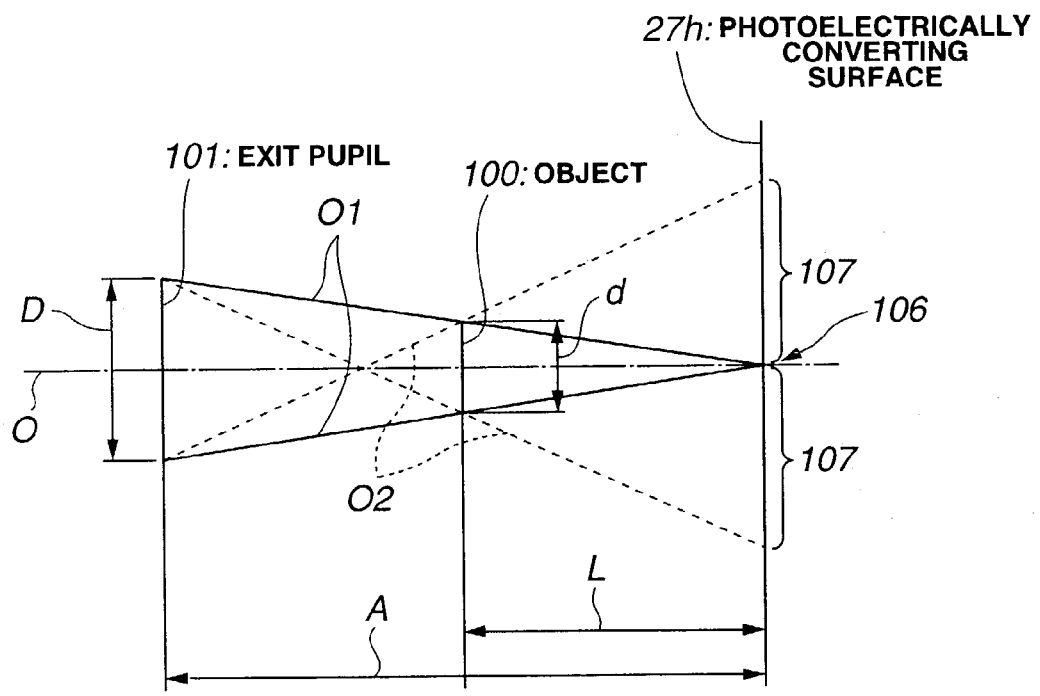
FIG. 12 is a conceptual diagram of the present invention.

FIG. 12 is a diagram showing the basic concept of the present invention, that is, a diagram for explaining a status of forming the shade of an object such as dust on the photoelectrically converting surface of the image pick-up device when the object exists between an exit pupil of the photographing optical system and the photoelectrically converting surface.

An exit pupil 101 of the photographing optical system (12a not shown in FIG. 12), an object 100 such as the dusts, and the photoelectrically converting surface 27h of the image pick-up device (27) are arranged along an optical axis O of the photographing optical system (12a). In this case, it is assumed that, a diameter of the exit pupil 101=D, a distance from the exit pupil 101 to the photoelectrically converting surface 27h=A, a diameter of the object 100=d, and a distance from the object 100 to the photoelectrically converting surface 27h=L.

The beams outputted from the exit pupil 101 and reaching the photoelectrically converting surface can generally be scattered and irradiated. Beams O1 shown in FIG. 12 among output beams represents beams contributing to the formation of an original shade of the object 100 onto the photoelectrically converting surface 27h among the beams outputted from the exit pupil 101. When the object 100 is at a position shown in FIG. 12 (at a position of the equivalent optical distance L in the air from the photoelectrically converting surface 27h), the original shade is formed substantially at a single point having an extremely narrow area shown by reference numeral 106 on the photoelectrically converting surface 27h. This portion is referred to as an original shade portion 106.

Beams O2 shown in FIG. 12 represents beams contributing to the formation of a half shade of the object 100 onto the photoelectrically converting surface 27h among the beams outputted from the exit pupil 101. When the object 100 is at the same position as that shown in FIG. 12 (at a position of the distance L), the half shade is relatively widely formed as shown by reference numeral 107. This portion is referred to as a half-shade portion 107. The half-shade portion 107 has a density lighter than that of the original shade portion 106.

Figure 13:
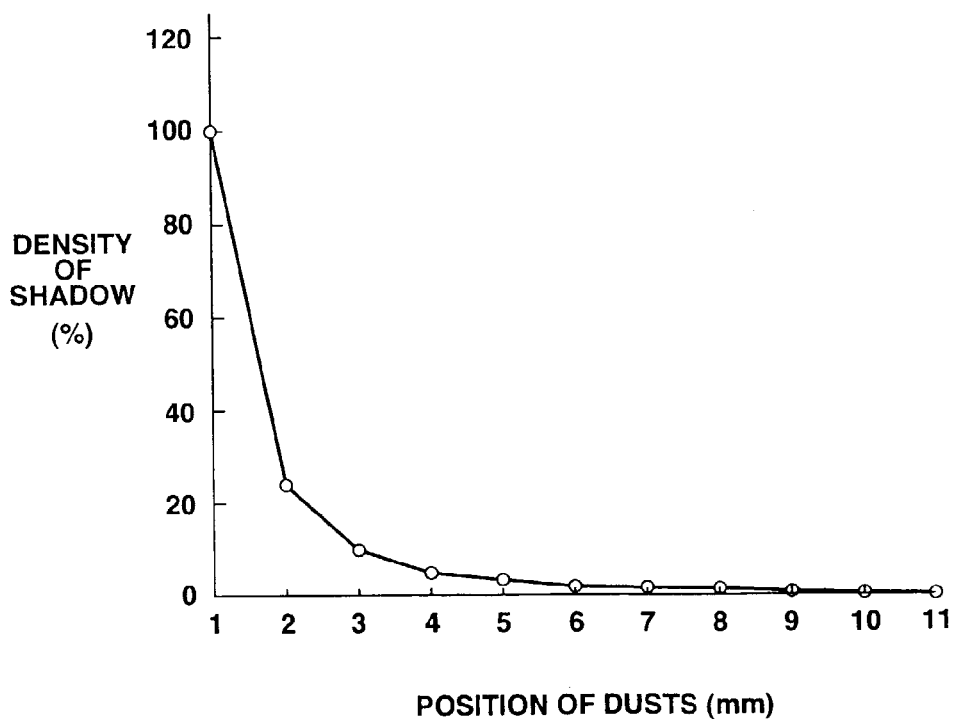
FIG. 13 is diagram showing a relationship between the distance from a photoelectrically converting surface of the image pick-up device in the camera to the position of an object such as dust and the density of a shade of the object formed onto the photoelectrically converting surface of in the present invention.

FIG. 13 is a diagram showing a relationship between the dimension of an interval from the photoelectrically converting surface 27h of the image pick-up device 27 to the position of the object 100 such as dust, namely, the distance L, and the density (darkness or lightness) of the shade of the object 100 formed onto the photoelectrically converting surface.

Hereinbelow, it is assumed that the density of the shade on the optical axis is considered as a reference one (=1 (100%)) when the equivalent optical distance L in the air from the photoelectrically converting surface 27h of the image pick-up device 27 to the position of the dust is 1 mm.

Referring to FIG. 13, as the object 100 such as the dust is more remote from the photoelectrically converting surface 27h, the shade of the object 100 formed onto the photoelectrically converting surface 27h generally become lighter.

As shown in FIG. 13, it is understood that when the distance L between the object 100 and the photoelectrically converting surface 27h is separated by approximately 5 mm, the density of the shade of the object 100 formed onto the photoelectrically converting surface 27h is approximately 5% of the density of the shade at the above-mentioned reference position (L=1 mm). Dust having a particle size of approximately $\frac{1}{10}$ (diameter of 0.2 mm) or less of the exit pupil have the shade density of 5% or less of that at the reference position. This shade density does not influence the image.

Therefore, it is preferable that the distance L between the object 100 and the photoelectrically converting surface 27h is 5 mm or more. The diameter of the object 100 in this case is, e.g., $\frac{1}{10}$ or less of the exit pupil of the photographing lens 12a.

As diameter D of the exit pupil is smaller, the size of the shade becomes larger. That is, as a stop is smaller, the condition is that the original shade is easily formed. In the photographing optical system (photographing lens) 12a used for the conventional general digital cameras having the interchangeable lens, the diameter upon using the smallest stop, namely, the diameter d of the exit pupil is D of approximately 2 mm. When the exit pupil D has less than the diameter d, the resolution and the sharpness are extremely decreased due to a light diffraction phenomenon. Therefore, this results in the reduction in image quality and, the use of the exit pupil D in this case is unpreferable.

On the other hand, the conventional digital cameras generally applies a so-called zoom lens capable of zooming a focusing distance of the photographing optical system 12a. A zoom ratio of the zoom lens is recently getting higher. For example, a high-ratio zoom lens is generally put into practical use and spread so as to easily photograph the image at a long-focusing area having the focusing distance of approximately 200 mm. Thus, in the case of the high-ratio zoom lens, the distance A between the exit pupil 101 and the photoelectrically converting surface 27h is set to be long in some degree.

As the distance A is longer, the beams outputted from the exit pupil 101 substantially become parallel. Consequently, as the distance A is longer, the original shade is easily formed.

In consideration of the foregoing, a condition that the original shade is easily formed is as follows.

For example, in the case of the zoom lens capable of photographing the image at the long-focusing area having the focusing distance of up to 200 mm, the distance A between the exit pupil 101 and the photoelectrically converting surface 27h is approximately 120 mm. It is assumed that the diameter D of the exit pupil of the photographing optical system is 2.4 mm and the distance L between the object 100 and the photoelectrically converting surface 27h is 5 mm. If the diameter d of the object 100 is 100 μm or more (d≧100 μm), the original shade is formed onto the photoelectrically converting surface 27h. On the other hand, the diameter d of the object 100 is less than 100 μm (d<100 μm), only the half shade is formed and the original shade is not formed.

As a result of an experiment of the present applicant, if the diameter d is less than 50 μm under the above optical condition, it is confirmed that the shade does not influence the photographing image.

Then, the density of the formed shade of the object 100 is estimated and the influence on the photographing image is further estimated by examining the half shade in this case.

In this case, it is assumed that a pixel pitch p of the image pick-up device 27 is 10 μm. Then, by using the conventional means disclosed in Japanese Patent Publication No. 2809133, the shade of the object 100 influences on the image formed onto the photoelectrically converting surface 27h. However, it is confirmed as the result of the experiment that in consideration of the diameter d (d<50 μm) of the object 100, the original shade is not formed and the half shade does not influence the image.

Incidentally, the object 100 having the size of the diameter d (<50 μm) corresponds to dust formed while operating a movable member such as the shutter.

As mentioned above, when the diameter d of the object 100 such as dust is less than 50 μm (d<50 μm), the dimension of the interval between the photoelectrically converting surface 27h of the image pick-up device 27 and the position of the object 100 adhered to the surface 21h of the dust-proofing filter 21 on the photographing lens side is set to have the equivalent optical path length of 5 mm or more in the air. Then, even if the exit pupil of the photographing optical system has the smallest stop and the photographing optical system has the long focusing distance, the original shade of the object 100 such as the dust is not formed.

The condition for preventing the formation of the original shade is as follows. That is, a relationship of $$L > A \times d/D$$

is established
where D: diameter of the exit pupil 101 of the photographing optical system,
d: diameter of the object 100, and
L: equivalent optical path length from the exit pupil 101 to the photoelectrically converting surface 27h in the air.

Herein, it is assumed that the equivalent optical path length in the air is designated by t, an index of refraction of the air is designated by n, an index of refraction of a predetermined medium is designated by n', and an optical path length of geometric beams in the medium is designated by t'. In this case, the following relationship is established.

$$t = (n/n')/t'$$

The above-mentioned position setting of the dust-proofing filter prevents the formation of the dark shade of dust particles having a diameter of 50 μm or less onto the photoelectrically converting surface and further prevents a negative influence on the image quality.

Next, a description is given of the advantageous structure for removing large dust particles (having a diameter of 50 μm or more) by vibrating the dust-proofing filter.

In general, it is well known that the setting of a short interval between the optical LPF 25 and the dust-proofing filter 21 (dust-proofing member) increases an inner pressure of the sealing space 51 upon vibrating the dust-proofing filter 21 by the piezoelectric element 22 (member for vibration) because the volume of the void portion 51a is reduced. However, when the inner pressure of sealing space 51 is high, the vibration of the dust-proofing filter 21 by the piezoelectric element 22 is inhibited.

On the other hand, the setting of a long interval between the optical LPF 25 and the dust-proofing filter 21 (dust-proofing member) for the sake of assuring the volume of the sealing space 51 increases the dimension of the image pick-up device unit 15 in the optical axis direction. Thus, this becomes a factor which inhibits the reduction in size of the camera 1 in the optical axis direction.

According to the first embodiment, by providing the space portion 51b outside the peripheral portion or the adjacent portion of the optical LPF 25, the volume of the sealing space 51 is sufficiently ensured. Then, the increase in size of the image pick-up device unit 15 in the optical axis direction is suppressed without inhibiting the vibration of the dust-proofing filter 21 which is applied by the piezoelectric element 22. Therefore, this easily contributes to the reduction in size of the camera 1 in the optical axis direction.

The vibration of the dust-proofing filter 21 caused by applying a periodic voltage to the piezoelectric element 22 enables shaking off relatively large dust particles (e.g., having the diameter of 1/10 or less of the exit pupil diameter of the photographing lens 12a to approximately 50 μm) adhered to the surface of the dust-proofing filter 21.

In the case of dust particles having a relatively small size, which are not shaken off by vibrating the dust-proofing filter 21, namely, dust particles having a size smaller than a diameter of 50 μm which can be caused by the operation of the internal mechanism upon operating the camera 1, the dust-proofing filter 21 and the image pick-up device 27 are arranged in consideration of the setting of the arrangement position of the dust-proofing filter 21 under the condition that the formation of the original shade of the dust onto the photoelectrically converting surface 27h is prevented even when the dust is adhered to the surface 21h of the dust-proofing filter 21. Thus, the image signal which enables indicating the preferable image can be obtained from the image indicated by the obtained image signal without any negative influence from the dust.

In the camera 1 according to the first embodiment, the dust-proofing filter supporting member 23 and the CCD case 24 are separately formed and they are airtightly fit to each other. However, the present invention is not limited to this and a single member may be formed by integrating the dust-proofing filter supporting member 23 and the CCD case 24. An example thereof is described hereinbelow according to a second embodiment of the present invention.

According to the second embodiment of the present invention, the structure is similar to that according to the first embodiment. Unlike the first embodiment, in place of the dust-proofing filter supporting member (23) and the CCD case (24), the second embodiment applies a single member (dust-proofing filter supporting and CCD case 33) formed by integrating them. Further, unlike the first embodiment, in place of the optical LPF 25, the second embodiment applies an optical LPF 25A having the structure slightly different from that of the optical LPF 25.

Therefore, the same reference numerals as those according to the first embodiment denote the same components and a detailed description is omitted. Further, the structure of the entire camera is not illustrated and is referred to FIGS. 1 and 2.

Figure 14:
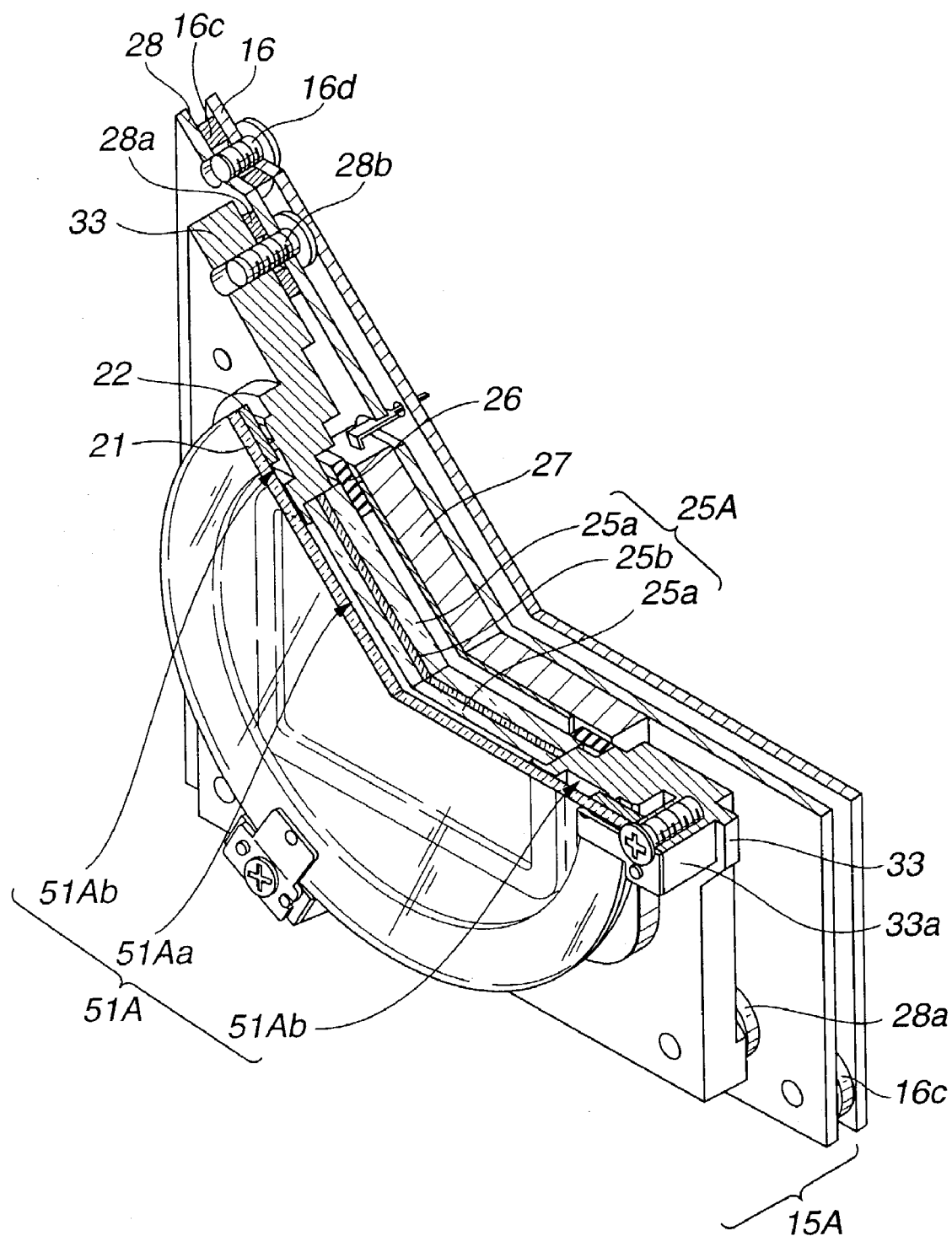
FIG. 14 is a perspective view showing by extracting a part forming an image pick-up device unit in a camera according to a second embodiment of the present invention, that is, showing a cut-off part of the assembled image pick-up device unit.
Figure 15:
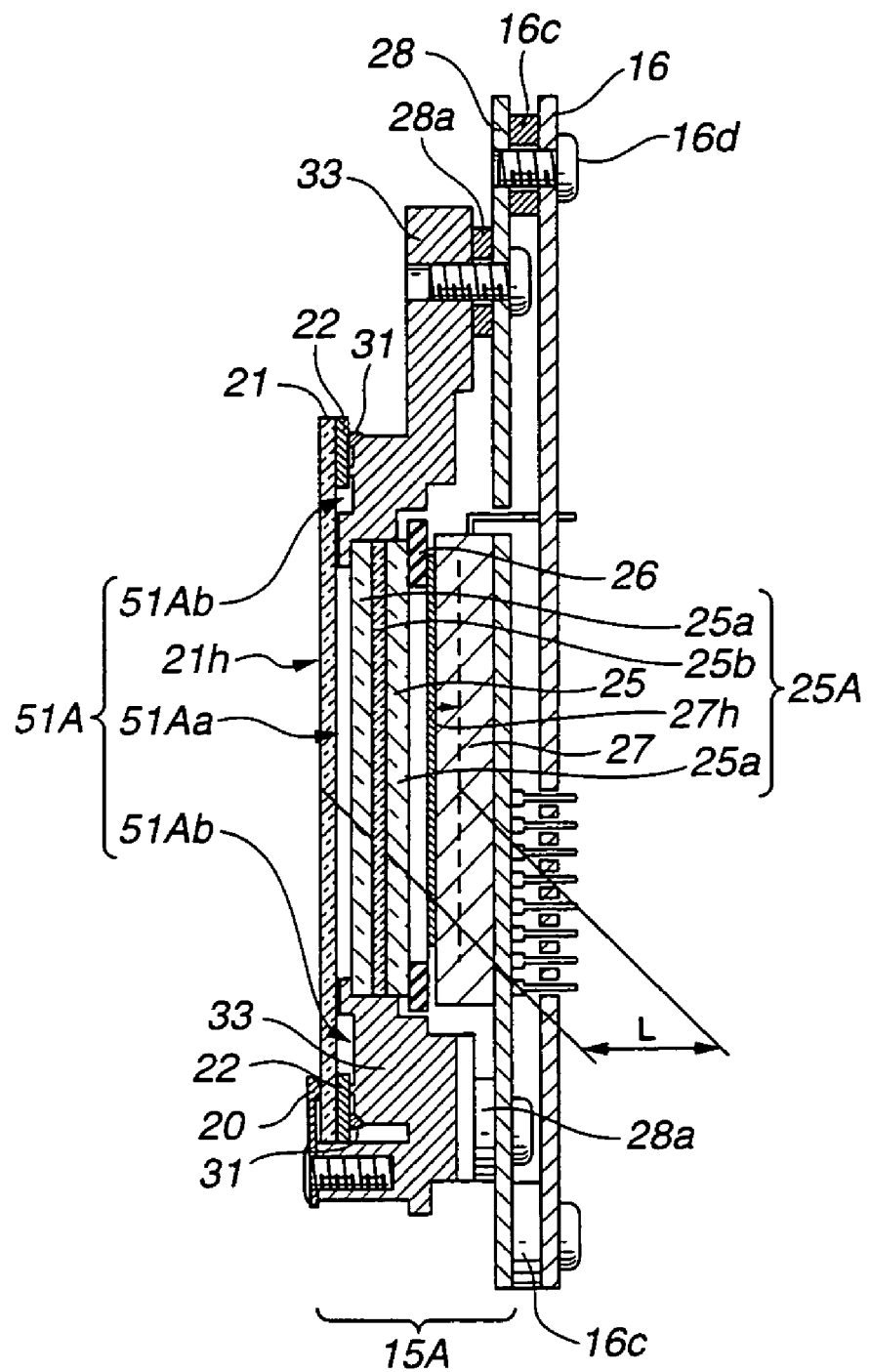
FIG. 15 is a sectional view along a cut-off plane in FIG. 14.

FIGS. 14 and 15 are diagrams showing by extracting a part of members forming an image pick-up device unit in a camera according to the second embodiment of the present invention. FIG. 14 is a perspective view showing a cut-off part of the assembled image pick-up device unit, corresponding to FIG. 4 according to the first embodiment. FIG. 15 is a sectional view along a cut-off plane shown in FIG. 14, corresponding to FIG. 5 according to the first embodiment.

Referring to FIGS. 14 and 15, similarly to FIGS. 4 and 5 according to the first embodiment, only the main portion of the image pick-up device unit is illustrated and the shutter unit is not shown. For the purpose of showing the positional relationship of the members, the main circuit board (16) is shown together.

As mentioned above, in an image pick-up device unit 15A according to the second embodiment, in place of the dust-proofing filter supporting member (23) and the CCD case (24) according to the first embodiment, the single member formed by integrating the dust-proofing filter supporting member (23) and the CCD case (24), that is, the dust-proofing filter supporting and CCD case (hereinafter, briefly referred to as a CCD case) 33 is used.

The CCD case 33 integrally includes a first portion and a second portion. That is, the first portion functions as the dust-proofing filter supporting unit for supporting the dust-proofing filter 21 in contact with the peripheral portion or the adjacent portion of the dust-proofing filter 21. The second portion functions as the image pick-up device accommodating case unit for accommodating, fixing, and holding the image pick-up device 27 and for supporting the optical LPF 25 in contact with the peripheral portion or the adjacent portion of the optical LPF 25. Thus, the sealing structure portion is integrally formed.

In the image pick-up device unit 15A of the camera (1) according to the second embodiment, the sealing structure portion is formed as follows.

That is, a predetermined void portion 51Aa is formed in a space formed by opposing the optical LPF 25A and the dust-proofing filter 21. On the peripheral side of the optical LPF 25A, a space portion 51Ab is formed by the CCD case 33 and the dust-proofing filter 21 to be extended towards the outside of the optical LPF 25A. The space portion 51Ab is set to be wider than the void portion 51Aa. A space containing the void portion 51Aa and the space portion 51Ab constitutes a sealing space 51A which is substantially airtightly sealed by the CCD case 33, the dust-proofing filter 21, and the optical LPF 25A.

As mentioned above, in the image pick-up device unit 15A in the camera according to the second embodiment, the sealing structure portion includes the sealing space 51A which is formed at the peripheries of the optical LPF 25A and the dust-proofing filter 21 and which is substantially sealed, including the void portion 51Aa. The sealing structure portion is provided at the position outside the periphery or the adjacent portion of the optical LPF 25A.

Further, according to the second embodiment, the sealing structure portion is constituted by the CCD case 33 and the like. The CCD case 33 is integrally constituted by the first portion for supporting the dust-proofing filter 21 in contact with the peripheral portion or the adjacent portion of the dust-proofing filter 21 and the second portion for supporting the optical LPF 25 in contact with the peripheral portion or the adjacent portion of the optical LPF 25A.

According to the second embodiment, the optical LPF 25A is formed by integrating a portion having a function as the optical LPF (portion shown by reference numeral 25a in FIGS. 14 and 15) and a portion having a function as the infrared cut-off filter (portion shown by reference numeral 25b in FIGS. 14 and 15).

Further, according to the second embodiment, the equivalent optical path length L between the photoelectrically converting surface 27h of the image pick-up device 27 (refer to FIG. 15) and the surface 21h of the dust-proofing filter 21 in the air is set to be equal to 5 mm or more, similarly to the first embodiment.

Other structures are entirely the same as those according to the first embodiment.

In the camera (1) with the above structure according to the second embodiment, the operation upon removing the dusts adhered to the surface of the dust-proofing filter 21 by vibrating the dust-proofing filter 21 by using the piezoelectric element 22 is the same as that according to the first embodiment.

As mentioned above, according to the second embodiment, the same advantages as those according to the first embodiment are obtained.

In addition, according to the second embodiment, the optical LPF 25A is formed by integrating the first portion having the function as the dust-proofing filter supporting unit for supporting the dust-proofing filter 21 in contact with the peripheral portion or the adjacent portion thereof and the second portion having the function as the image pick-up device accommodating case unit for accommodating, fixing, and holding the image pick-up device 27 and for supporting the optical LPF 25A in contact with the peripheral portion or the adjacent portion thereof. Thus, the photoelectrically converting surface of the image pick-up device and the dust-proofing filter are accurately positioned. The simplification of the structure contributes to the reduction in number of members, the manufacturing process is simplified, and the manufacturing costs are reduced.

According to the second embodiment, the optical LPF 25A is formed by integrating the portion (shown by reference numeral 25a in FIGS. 14 and 15) having the function as the optical LPF and the portion (shown by reference numeral 25b in FIGS. 14 and 15) having the function as the infrared cut-off filter. However, the present invention is not limited to this. For example, similarly to the optical LPF 25 according to the first embodiment, the optical LPF 25A which has the single function as the optical LPF may be used.

In the camera 1 according to the first and second embodiments, the optical LPF 25 or 25A is provided. However, the present invention is not limited to this and may use an image pick-up device unit having no optical LPF in the camera.

For example, in the case of a digital camera using a numerous-pixel type image pick-up device in which the number of valid pixels (the number of pixels used for formation of image data) of the image pick-up device exceeds the resolution of the lens, the image pick-up device unit is formed by excluding the optical LPF in front of the image pick-up device. The present invention can easily be applied in the above-mentioned case. According to a third embodiment, an example thereof will be described hereinbelow.

In other words, the structure according to the third embodiment is substantially the same as that according to the second embodiment. Unlike the second embodiment, the optical LPF (25A) according to the second embodiment is excluded and a CCD case 34 for supporting the dust-proofing filter 21 and for fixing and holding the image pick-up device 27 is used in place of the CCD case (33) for supporting the dust-proofing filter 21 and for fixing and holding the image pick-up device 27 and the optical LPF (25A). Therefore, the same structure as that according to the second embodiment is designated by the same reference numeral and is not described in detail. The structure of the entire camera is not illustrated similarly to the second embodiment and is referred to in FIGS. 1 and 2 using for the description of the first embodiment.

Figure 16:
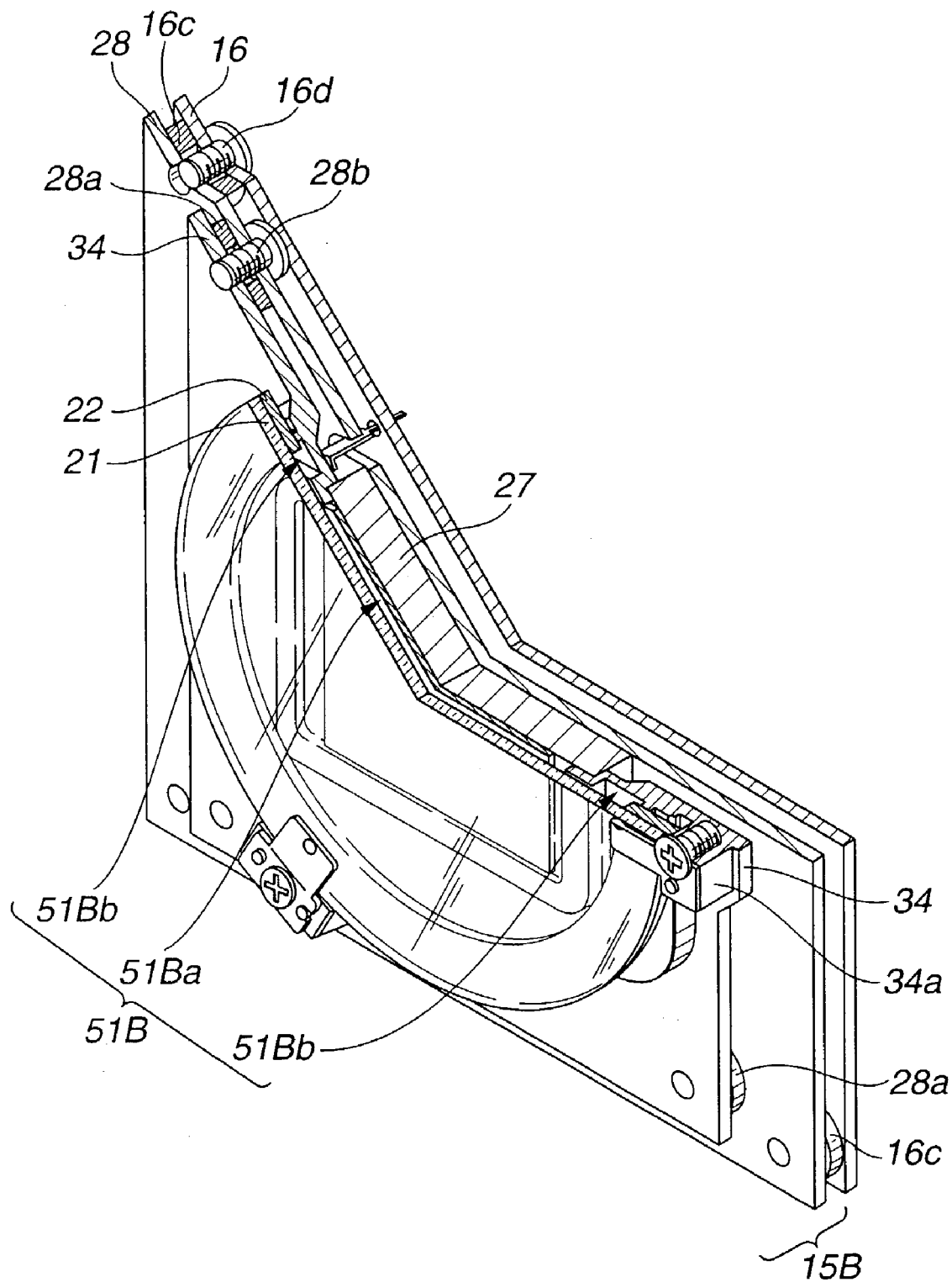
FIG. 16 is a perspective view showing by extracting a part forming an image pick-up device unit in a camera according to a third embodiment of the present invention, that is, showing a cut-off part of the assembled image pick-up device unit.
Figure 17:
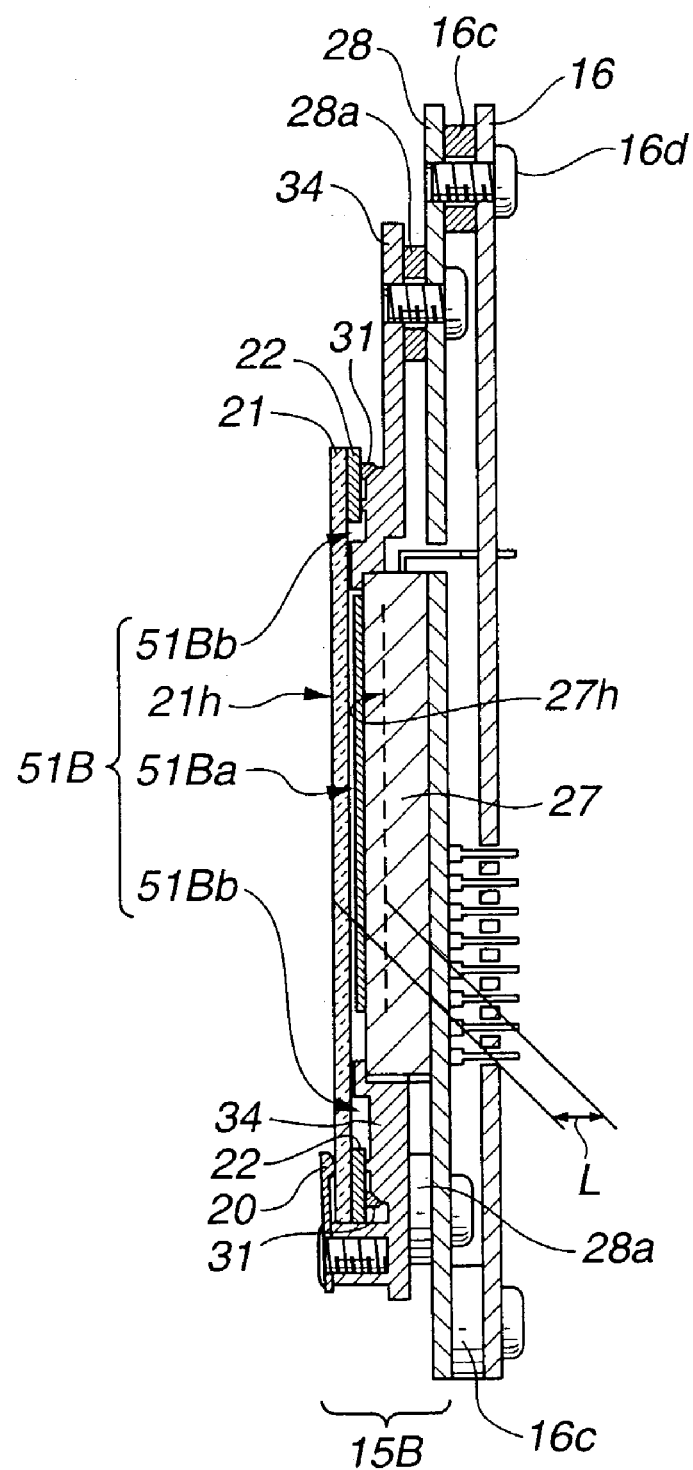
FIG. 17 is a sectional view along a cut-off plane in FIG. 16.

FIGS. 16 and 17 are diagrams showing by extracting a part of the image pick-up device unit in the camera according to the third embodiment of the present invention. FIG. 16 is a perspective view showing a cut-off part of the assembled image pick-up device unit, corresponding to FIG. 4 according to the first embodiment or to FIG. 14 according to the second embodiment. FIG. 17 is a sectional view along a cut-off plane shown in FIG. 16, corresponding to FIG. 5 according to the first embodiment or to FIG. 15 according to the second embodiment.

Referring to FIGS. 16 and 17, similarly to FIGS. 4 and 5 according to the first embodiment and FIGS. 14 and 15 according to the second embodiment, only the main portion of the image pick-up device unit is shown and the shutter unit is not shown. The main circuit board (16) is also similarly illustrated for the purpose of showing the positional relationship of the members.

As mentioned above, according to the third embodiment, an image pick-up device unit 15B is formed by excluding the optical LPF 25 or 25A in the camera (1) according to the first or second embodiment. Further, similarly to the second embodiment, the image pick-up device unit 15B comprises the dust-proofing filter supporting and CCD case 34, as an integrated single member in place of having the dust-proofing filter supporting member (23) and the CCD case (24) separately according to the first embodiment.

The CCD case 34 integrally includes a first portion and a second portion. That is, the first portion functions as the dust-proofing filter supporting unit for supporting the dust-proofing filter 21 in contact with the peripheral portion or the adjacent portion of the dust-proofing filter 21. The second portion functions as the image pick-up device accommodating case unit for supporting the photoelectrically converting surface 27h of the image pick-up device 27 in contact with the peripheral portion or the adjacent portion of the image pick-up device 27. Thus, the sealing structure portion is formed.

The sealing structure portion in the image pick-up device unit 15B in the camera (1) is structured as follows according to the third embodiment.

That is, a predetermined void portion 51Ba is formed in a space formed by opposing the image pick-up device 27 and the dust-proofing filter 21. A space portion 51Bb is formed by the CCD case 34 and the dust-proofing filter 21, extending to the outside of the photoelectrically converting surface 27h on the peripheral side of the photoelectrically converting surface 27h of the image pick-up device 27. The space portion 51Bb is set to be wider than the void portion 51Ba. A space containing the void portion 51Ba and the space portion 51Bb forms a sealing space 51B which is substantially airtightly sealed by the CCD case 34, the dust-proofing filter 21, and the photoelectrically converting surface 27h of the image pick-up device 27.

As mentioned above, in the image pick-up device unit 15B in the camera according to the third embodiment, the sealing structure portion is formed to constitute the sealing space 51B which is formed at the photoelectrically converting surface 27h of the image pick-up device 27 and at the periphery of the dust-proofing filter 21, containing the void portion 51Ba, and being substantially sealed. The sealing structure portion is provided at the position outside the periphery or adjacent portion of the photoelectrically converting surface 27h of the image pick-up device 27.

Further, according to the third embodiment, the sealing structure portion includes the CCD case 34 which is formed by integrating the first portion and the second portion. That is, the first portion supports the dust-proofing filter 21 in contact with the peripheral or the adjacent portion thereof. The second portion supports the photoelectrically converting surface 27h of the image pick-up device 27 in contact with the peripheral or the adjacent portion thereof.

According to the third embodiment, the image pick-up device unit 15B is formed by excluding the optical device as mentioned above. Therefore, the dust-proofing filter 21 has a transparent portion which is arranged and opposed to the front of the photoelectrically converting surface 27h of the image pick-up device 27 at a predetermined interval.

Further, according to the third embodiment, the equivalent optical path length L between the photoelectrically converting surface 27h of the image pick-up device 27 (refer to FIG. 17) and the surface 21h of the dust-proofing filter 21 in the air is set to be equal to 5 mm or more, similarly to the first embodiment.

Other structures are the same as those according to the first and second embodiments. According to the third embodiment, the operation upon removing the dusts adhered to the surface of the dust-proofing filter 21 by vibrating the dust-proofing filter 21 by using the piezoelectric element 22 is the same as that according to the first and second embodiments.

As mentioned above, in the camera using the image pick-up device unit which is formed by excluding the optical LPF 25 according to the third embodiment, the same advantages as those according to the second embodiment are obtained.

According to the third embodiment, the optical LPF is formed by integrating the first portion having the function as the dust-proofing filter supporting unit for supporting the dust-proofing filter 21 in contact with the peripheral portion or the adjacent portion thereof and the second portion having the function as the image pick-up device accommodating case unit for supporting the photoelectrically converting surface 27h of the image pick-up device 27 in contact with the peripheral portion or the adjacent portion thereof. Thus, the simplification of the structure contributes to the reduction in number of members, the manufacturing process is simplified, and the manufacturing costs are reduced.

According to the third embodiment, similarly to the first and second embodiments, the dust-proofing filter 21 may use the optical member having a function of a protecting glass. In addition, the dust-proofing filter 21 may use the optical member having the function of the optical low-pass filter or the infrared cut-off filter.

According to the third embodiment, the camera is formed by excluding the optical low-path filter (optical LPF; optical device) according to the first embodiment. Further, the sealing structure portion is structured by the CCD case (34) which is formed by integrating the first portion for supporting the dust-proofing filter 21 and the second portion for supporting the image pick-up device 27. However, the present invention is not limited to this. In the example according to the third embodiment, namely, in the image pick-up device unit having no optical LPF in the camera, the dust-proofing filter supporting member (23) and the CCD case (24) may independently be formed similarly to the first embodiment and they further may airtightly be fit to each other.

It should be understood that the present invention is not limited to the precise disclosed embodiments, and various changes and modifications thereof can be made without departing from the spirit or scope of the invention.

What is claimed is:

1. A camera comprising:
   an image pick-up device which obtains an image signal corresponding to beams irradiated onto a photoelectrically converting surface thereof;
   an exchangeable photographing lens which inputs a subject image onto the photoelectrically converting surface of the image pick-up device;
   an image signal processing circuit which converts an image signal obtained from the image pick-up device, corresponding to an image formed onto the photoelectrically converting surface of the image pick-up device, into a signal suitable to recording;
   a dust-proofing member having a substantially circular or polygonal plate-shape and comprising a transparent portion at an area having at least a predetermined length in a radial direction from a center of the dust-proofing member, wherein the transparent portion is opposed to a front of the photographing lens at a predetermined interval, and wherein an interval of an equivalent optical path length of at least 5 mm is provided between a surface of the dust-proofing member and the photoelectrically converting surface of the image pick-up device;
   a vibration generating member, for vibrating the dust-proofing member, arranged outside an area through which the beams pass through the dust-proofing member, wherein the vibration generating member includes a piezoelectric element made of piezoelectric ceramics; and
   a sealing structure portion arranged at a portion formed by opposing the image pick-up device and the dust-proofing member, the sealing structure portion sealing a space portion that is substantially sealed at peripheral portions of the image pick-up device and the dust-proofing member.

2. The camera according to claim 1, wherein the vibration generating member causes the dust-proofing member to vibrate in a standing wave.

3. The camera according to claim 1, wherein the dust-proofing member comprises an optical low-pass filter.

4. The camera according to claim 1, wherein the dust-proofing member comprises an infrared cut-off filter.

5. The camera according to claim 1, wherein the dust-proofing member comprises a protecting glass of the image pick-up device.

6. The camera according to claim 1, wherein an optical low-pass filter is arranged between the image pick-up device and the dust-proofing member.

7. The camera according to claim 1, wherein an infrared-cut-off filter is arranged between the image pick-up device and the dust-proofing member.

8. A camera comprising:
   an image pick-up device which obtains an image signal corresponding to beams irradiated onto a photoelectrically converting surface thereof;
   an optical member having a first surface opposed to a front of the image pick-up device at a predetermined interval; and
   a sealing structure portion arranged at a portion formed by opposing the image pick-up device and the optical member, the sealing structure portion sealing a space portion that is substantially sealed at peripheral portions of the image pick-up device and the optical member,
   wherein a dimension of an interval between the photoelectrically converting surface of the image pick-up device and a second surface of the optical member is set such that when positioning an object having a diameter of 1/10 or less of an exit pupil of a photographing lens on the second surface of the optical member, a density of a shade formed onto the photoelectrically converting surface is approximately 5% or less of a density of a shade formed by the object when placing the second surface of the optical member at a position of an equivalent optical path length of 1 mm in air from the photoelectrically converting surface.

9. The camera according to claim 8, wherein a dimension of the interval has an equivalent optical path length of 5 mm or more in air.

10. The camera according to claim 8, further comprising:
    a vibration generating member arranged at the peripheral portion of the optical member for vibrating the optical member.

11. An image pick-up device unit comprising:
    an image pick-up device which obtains an image signal corresponding to beams irradiated onto a photoelectrically converting surface thereof;
    an optical member having a first surface opposed to a front of the image pick-up device at a predetermined interval; and
    a sealing structure portion arranged at a portion formed by opposing the image pick-up device and the optical member, and the sealing structure portion sealing a space portion that is substantially sealed at peripheral portions of the image pick-up device and the optical member,
    wherein a condition for preventing formation of an original shade of an object onto a second surface of the optical member is set to establish a relationship of an equivalent optical path length L in air between the object and the photoelectrically converting surface of the image pick-up device, such that:

$$L > A \times d / D$$

where a diameter of an exit pupil of a photographing lens is designated by D, a diameter of the object is d, and an equivalent optical path length in air from a position of the exit pupil to the photoelectrically converting surface of the image pick-up device is designated by A.

12. The image pick-up device unit according to claim 11, further comprising:
    a vibration generating member arranged at the peripheral portion of the optical member for vibrating the optical member.

13. An image pick-up device unit applicable to a camera to which a photographing lens is exchangeably attached, said image pick-up unit comprising:
    an image pick-up device which obtains an image signal corresponding to beams irradiated onto a photoelectrically converting surface thereof;
    a plate-shaped optical member having a first surface opposed to a front of the image pick-up device at a predetermined interval;
    a vibration generating member, for vibrating the optical member, arranged outside an area through which the beams pass to be irradiated onto the photoelectrically converting surface of the image pick-up device, wherein the vibration generating member includes a piezoelectric element made of piezoelectric ceramics; and a sealing structure portion arranged at a portion formed by opposing the image pick-up device and the optical member, the sealing structure portion sealing a space portion that is substantially sealed at peripheral portions of the image pick-up device and the optical member, wherein an interval between the photoelectrically converting surface of the image pick-up device and a second surface of the optical member is set such that when a non-transparent object having a diameter of not more than 50 µm is positioned on the second surface of the optical member, a shade density of a shade of the object on the photoelectrically converting surface of the image pick-up device is not more than 5%.

14. A camera comprising:

an exchangeable photographing lens;

an image pick-up device which obtains an image signal corresponding to beams irradiated onto a photoelectrically converting surface thereof;

a plate-shaped optical member having a first surface opposed to a front of the image pick-up device at a predetermined interval;

a vibration generating member, for vibrating the optical member, arranged outside an area through which the beams pass to be irradiated onto the photoelectrically converting surface of the image pick-up device, wherein the vibration generating member includes a piezoelectric element made of piezoelectric ceramics; and a sealing structure portion arranged at a portion formed by opposing the image pick-up device and the optical member, the sealing structure portion sealing a space portion that is substantially sealed at peripheral portions of the image pick-up device and the optical member, wherein an interval between the photoelectrically converting surface of the image pick-up device and a second surface of the optical member is set to have a dimension such that when a non-transparent object having a diameter of not more than 50 µm is positioned on the second surface of the optical member, a shade density of a shade of the object on the photoelectrically converting surface of the image pick-up device is not more than 5%.

15. The camera according to claim 14, wherein the dimension of the interval is determined based on a size of an exit pupil of the photographing lens.

16. The camera according to claim 14, wherein the dimension of the interval is determined based on a focusing distance of the photographing lens.

17. The camera according to claim 14, wherein the dimension of the interval is determined based on a distance from a position of the exit pupil of the photographing lens to the photoelectrically converting surface of the image pick-up device.

18. The camera according to claim 14, wherein the dimension of the interval is determined based on a size of an exit pupil of the photographing lens, a focusing distance of the photographing lens, and a distance from a position of an exit pupil of the photographing lens to the photoelectrically converting surface of the image pick-up device.

19. The camera according to claim 14, wherein the dimension of the interval is determined based on a pixel interval of the image pick-up device.

20. An image pick-up device unit applicable to a camera to which a photographing lens is exchangeably attached, said image pick-up unit comprising:

an image pick-up device which obtains an image signal corresponding to beams irradiated onto a photoelectrically converting surface thereof;

a dust-proofing member having a substantially circular or polygonal plate-shape and comprising a transparent portion at an area having at least a predetermined length in a radial direction from a center of the dust-proofing member, wherein an interval of an equivalent optical path length of at least 5 mm is provided between a surface of the dust-proofing member and the photoelectrically converting surface of the image pick-up device;

a vibration generating member, for vibrating the dust-proofing member, arranged outside an area through which the beams pass through the dust-proofing member, wherein the vibration generating member includes a piezoelectric element made of piezoelectric ceramics; and a sealing structure portion arranged at a portion formed by opposing the image pick-up device and the dust-proofing member, the sealing structure portion sealing a space portion that is substantially sealed at peripheral portions of the image pick-up device and the dust-proofing member.

21. The image pick-up device unit according to claim 20, wherein the vibration generating member causes the dust-proofing member to vibrate in a standing wave.

22. The image pick-up device unit according to claim 20, wherein the dust-proofing member comprises an optical low-pass filter.

23. The image pick-up device unit according to claim 20, wherein the dust-proofing member comprises an infrared cut-off filter.

24. The image pick-up device unit according to claim 20, wherein the dust-proofing member comprises a protecting glass of the image pick-up device.

25. The image pick-up device unit according to claim 20, wherein an optical low-pass filter is arranged between the image pick-up device and the dust-proofing member.

26. The image pick-up device unit according to claim 20, wherein an infrared cut-off filter is arranged between the image pick-up device and the dust-proofing member.

* * * * *